US012736634B2

(12) United States Patent
Yang et al.

(10) Patent No.: US 12,736,634 B2
(45) Date of Patent: Sep. 15, 2026

(54) LIDAR, AND DETECTION METHOD AND MANUFACTURING METHOD FOR LIDAR

(71) Applicant: NINGBO SUNNY AUTOMOTIVE OPTECH CO., LTD., Yuyao City (CN)

(72) Inventors: Jia Yang, Yuyao City (CN); Qiang Wang, Yuyao City (CN); Shiyi Guo, Yuyao City (CN); Yanting Cao, Yuyao City (CN); Jiahui Han, Yuyao City (CN)

(73) Assignee: NINGBO SUNNY AUTOMOTIVE OPTECH CO., LTD., Yuyao City (CN)

( * ) Notice: Subject to any disclaimer, the term of this patent is extended or adjusted under 35 U.S.C. 154(b) by 1060 days.

(21) Appl. No.: 17/791,040

(22) PCT Filed: Mar. 5, 2021

(86) PCT No.: PCT/CN2021/079408

§ 371 (c)(1),
(2) Date: Jul. 6, 2022

(87) PCT Pub. No.: WO2021/139834

PCT Pub. Date: Jul. 15, 2021

(65) Prior Publication Data

US 2023/0028159 A1 Jan. 26, 2023

(30) Foreign Application Priority Data

Jan. 6, 2020 (CN) ......................... 202010008629.6
Jan. 6, 2020 (CN) ......................... 202010008630.9

(51) Int. Cl.
*G01S 7/481* (2006.01)
*G02B 26/10* (2006.01)
*G02B 27/09* (2006.01)

(52) U.S. Cl.
CPC .......... *G01S 7/4817* (2013.01); *G01S 7/4814* (2013.01); *G02B 26/10* (2013.01); *G02B 27/0955* (2013.01)

(58) Field of Classification Search
CPC .... G01S 7/4817; G01S 7/4814; G01S 7/4815; G01S 17/42; G02B 26/10; G02B 27/0955; G02B 26/108; G02B 26/101
See application file for complete search history.

(56) References Cited

U.S. PATENT DOCUMENTS 6,572,017 B1 6/2003 Stoner
2007/0181810 A1* 8/2007 Tan ...................... G01S 7/4811 250/341.1

(Continued)

FOREIGN PATENT DOCUMENTS

CN 107219532 A 9/2017
CN 207557465 U 6/2018

(Continued)

OTHER PUBLICATIONS

International Search Report, issued in PCT/CN2021/079408, dated May 8, 2021.

(Continued)

*Primary Examiner* — Isam A Alsomiri
*Assistant Examiner* — Joseph C Fritchman
(74) *Attorney, Agent, or Firm* — Birch, Stewart, Kolasch & Birch, LLP

(57) ABSTRACT

Disclosed are a lidar, and a detection method for the lidar. The lidar includes a plurality of laser transceiver module groups, each configured to be integrated with at least one laser transmitting end and at least one laser receiving end, and a scanning module. The plurality of laser transceiver module groups are arranged in a distributed manner relative to the scanning module, and an at least partially stitched field (Continued)

of view of the lidar is formed by sub-fields of view correspondingly formed by the plurality of laser transceiver module groups. Further disclosed are a lidar and a manufacturing method for the lidar. The lidar includes a laser transmitting end, a laser receiving end, a scanning module and an isolation mechanism. A scanning component of the scanning module is constructed as a rotatable plate-shaped double-faceted mirror or a rotatable prism.

20 Claims, 10 Drawing Sheets

(56) References Cited

U.S. PATENT DOCUMENTS

| | | | | |
|---|---|---|---|---|
| 2014/0198308 | A1* | 7/2014 | Kim | G01S 7/4817 356/4.01 |
| 2018/0143308 | A1 | 5/2018 | Vlaiko et al. | |
| 2019/0228537 | A1* | 7/2019 | Sekiguchi | G01S 17/931 |
| 2019/0242981 | A1* | 8/2019 | Otani | G01S 7/4813 |
| 2020/0355800 | A1* | 11/2020 | Toyama | G01S 7/4816 |
| 2021/0364608 | A1* | 11/2021 | Xiang | G01S 7/4817 |
| 2022/0099833 | A1* | 3/2022 | Hayashi | G01S 7/4813 |
| 2022/0171071 | A1* | 6/2022 | Liu | G01S 7/4817 |
| 2022/0276353 | A1* | 9/2022 | Mohr | G02B 26/124 |
| 2022/0342051 | A1* | 10/2022 | Guo | G01S 7/4817 |

FOREIGN PATENT DOCUMENTS

| | | | | |
|---|---|---|---|---|
| CN | 109490908 | A | 3/2019 | |
| CN | 109597050 | A | 4/2019 | |
| CN | 109828259 | A | 5/2019 | |
| CN | 109884656 | A | 6/2019 | |
| CN | 109997057 | A | 7/2019 | |
| CN | 110118972 | A | 8/2019 | |
| CN | 110333511 | A | 10/2019 | |
| CN | 110632618 | A | 12/2019 | |
| CN | 209979851 | U | 1/2020 | |
| CN | 112098972 | A | 12/2020 | |
| DE | 10 2015 013 710 | A1 | 4/2017 | |
| KR | 10-2019-0130468 | A | 11/2019 | |
| WO | WO-2017082540 | A1 * | 5/2017 | G06K 7/10683 |
| WO | WO 2019/140792 | A1 | 7/2019 | |

OTHER PUBLICATIONS

Zhaoshuo et al., "Study on Method of Scaning and Detecting with Two Beams for Laser Radar", Applied Laser, vol. 23, No. 2, Apr. 2023, pp. 91-93.

* cited by examiner

LIDAR, AND DETECTION METHOD AND MANUFACTURING METHOD FOR LIDAR

CROSS REFERENCE TO RELATED APPLICATIONS

This application is the National Phase of PCT/CN2021/079408 filed on Mar. 5, 2021, which claims priority under 35 U.S.C. § 119 (a) to patent application No. 202010008629.6 filed in China on Jan. 6, 2020 and patent application No. 202010008630.9 filed in China on Jan. 6, 2020, all of which are hereby expressly incorporated by reference into the present application.

TECHNICAL FIELD

The present disclosure relates to a lidar, and a detection method and manufacturing method for the lidar.

TECHNICAL BACKGROUND

The descriptions herein merely provide background information related to the present disclosure and do not necessarily constitute the prior art.

There is currently a mechanical rotating lidar, which uses a plurality of transmitting lasers and a plurality of receiving detectors to achieve multi-line scanning, and achieves 360° scanning in the horizontal field of view through a rotating platform. Regarding this mechanical rotating lidar, the applicant realized that this mechanical rotating lidar has the disadvantages that the scanning frame rate is low, the system structure is complex, and the lasers and the detectors need to be adjusted separately. In addition, this lidar has a long assembly cycle, thus resulting in high cost, which limits the development of lidar.

There is also a MEMS-based lidar. For this MEMS-based lidar, the applicant realized the following. First, in order to ensure a higher vibration frequency, generally, the aperture of the MEMS micro-oscillating mirror cannot be too large, and laser light emitted by the laser needs to be collimated. However, generally, the aperture after collimation will be larger than the aperture of the MEMS micro-oscillating mirror, which leads to low energy coupling efficiency of the system. Secondly, at higher vibration frequencies, the scanning field of view of the MEMS micro-oscillating mirror is small, the optical angle is usually only 30° to 40°. In order to meet a requirement of a large field of view, a plurality of lidars are required for field-of-view stitching. Finally, limited by the process, it is difficult for the MEMS micro-oscillating mirror to pass a vehicle regulation test, and the cost is high.

The Lidar uses laser light as a light source and emits it to a target object. The target object produces diffuse reflection, and the reflected laser light (including physical information such as amplitude and phase) is accepted by a detector, so as to obtain information such as the distance and orientation of the target object, and achieve three-dimensional detection of the surrounding environment.

The traditional mechanical lidar drives a mechanical shaft through a motor to achieve the rotation of the entire transceiver system. Using this traditional mechanical lidar to scan the surrounding environment has the disadvantages such as slow speed of the transceiver system, large volume of the radar, unstable operation, and poor performance reliability. An opto-electromechanical system includes a transmitting system and a receiving system, but the beam emitted by the transmitting system is discrete, which will cause the vertical angular resolution of detection to be limited by the discrete beam. There is also a lidar solution to improve the vertical angular resolution by increasing the number of laser beams, but this will directly lead to an increase in the volume and cost of the lidar, and at the same time, the number of detectors needs to be increased, which further increases the cost and system complexity.

The MEMS lidar usually adopts the form of single-point scanning, and achieves the scanning of the target range with the high-speed rotation of the MEMS device. Although the MEMS lidar can partially solve the problem of large volume, because the transmitting system emits a single light spot, such as Lissajous and other scanning forms, the scanning frequency of MEMS is extremely demanding. Higher scanning frequency means higher MEMS cost. Conversely, if the scanning frequency of the MEMS is insufficient, the vertical and horizontal resolution of the lidar will be limited. In addition, in the MEMS lidar, two matched single-axis MEMSs or a dual-axis MEMS is usually required to achieve full range scanning, which can significantly increase the cost and system control complexity of the lidar.

Therefore, how to achieve a high-resolution, small-volume lidar while reducing the manufacturing cost of the lidar has become an urgent problem to be solved.

SUMMARY

One of the objectives of the present disclosure is to provide a lidar and a detection method for the lidar, which can flexibly and reliably match specific application environments and performance requirements, especially with adjustable (especially increasable) field of view, scanning frequency and scanning resolution of the lidar, while ensuring that the lidar system is simple in structure, low in cost, fast in assembly and simple in testing.

Therefore, according to a first aspect of the present disclosure, a lidar is proposed, comprising:

a laser transmitting end, wherein the laser transmitting end has a laser, and the laser is configured for emitting a laser beam for detecting a target object;

a scanning module, wherein the scanning module is configured for guiding the laser beam emitted by the laser to scan the target object, and receiving and guiding the laser beam reflected from the target object; and a laser receiving end, wherein the laser receiving end has a detector, and the detector is configured for receiving the laser beam guided by the scanning module and reflected from the target object;

wherein at least one laser transmitting end and at least one laser receiving end are integrated into a laser transceiver module group configured as a separate structural unit, and wherein the lidar comprises a plurality of laser transceiver module groups, the plurality of laser transceiver module groups are arranged in a distributed manner relative to the scanning module, and an at least partially stitched field of view of the lidar is formed by sub-fields of view correspondingly formed by the plurality of laser transceiver module groups.

With the technical solutions proposed in the first aspect of the present disclosure, by arranging a plurality of laser transceiver module groups in a specific manner, it is possible to achieve efficient and targeted stitching of the detection field of view of the lidar, especially to achieve a greater horizontal field-of-view angle, in which the central field of view has an overlapping part. Therefore, in the case of using a limited number of components, the field of view of the lidar can be expanded in a simple way, and the scanning frequency and detection accuracy of key test areas can be improved, especially vertical-axis (in a vertical direction) scanning resolution and/or horizontal scanning resolution.

In addition, it is easy for the lidar according to the first aspect of the present disclosure to implement modular assembly and have a simple structure, a low cost, and a short assembly cycle, and with respect to the application environment conditions, it can also flexibly and quickly obtain lidar performance that matches the requirements.

According to some implementations of the first aspect of the present disclosure, the laser transmitting end further comprises a transmitting lens group, which has a laser shaping module configured for shaping the laser beam emitted by the laser.

According to some implementations of the first aspect of the present disclosure, the laser shaping module comprises a collimator and a homogenizer sequentially arranged along an optical axis of the laser beam.

According to some implementations of the first aspect of the present disclosure, the laser shaping module shapes the laser beam emitted by the laser transmitting end into a linear light spot.

With the technical solution proposed in the first aspect of the present disclosure, for example, the laser beam is shaped into a linear light spot, and a one-dimensional scanning module can be used to achieve three-dimensional scanning, thereby reducing the requirements for scanning components and reducing the overall cost of the lidar. At the same time, by shaping the laser beam into a linear light spot, in combination with the relevant improvement measures for the laser transceiver module group proposed in the first aspect of the present disclosure, an improved stitched field of view of the lidar can be obtained, and the scanning range and/or scanning resolution of the lidar can be correspondingly increased, significantly improving the working flexibility, reliability and performance of the lidar.

According to some implementations of the first aspect of the present disclosure, the scanning module comprises a transmission scanning module and a reception scanning module, wherein the transmission scanning module is configured for reflecting the laser beam emitted by the laser transmitting end to the target object, and the reception scanning module is configured for receiving and guiding the laser beam reflected from the target object to the laser receiving end.

According to some implementations of the first aspect of the present disclosure, the laser receiving end further has a receiving lens group, and the receiving lens group is configured for receiving and transmitting the laser beam guided by the scanning module and reflected from the target object, and converging the reflected laser beam onto the detector of the laser receiving end.

According to some implementations of the first aspect of the present disclosure, included angles between the laser beams emitted by the laser transmitting ends of the plurality of laser transceiver module groups and a reflective surface of the scanning module are different from each other, so that the plurality of laser transceiver module groups separately form sub-fields of view with different orientations and at least partially overlapping each other.

According to some implementations of the first aspect of the present disclosure, the lidar further comprises an orientation adjustment device, through which the plurality of laser transceiver module groups can adjust their orientations relative to a reflective surface of the scanning module, thereby being able to change the stitched field of view and/or scanning resolution of the lidar.

According to some implementations of the first aspect of the present disclosure, a change in the stitched field of view and/or scanning resolution of the lidar can be achieved in a vertical-axis direction and/or a horizontal direction.

According to some implementations of the first aspect of the present disclosure, the orientation adjustment device comprises an actuator, wherein the orientation adjustment of the laser transceiver module group is achieved by controlling the actuator for driving the orientation adjustment device.

According to some implementations of the first aspect of the present disclosure, the actuator is an electric motor, a hydraulic actuator, a pneumatic actuator or a piezoelectric actuator.

According to some implementations of the first aspect of the present disclosure, the orientation adjustment devices assigned to each laser transceiver module group can be controlled according to a predetermined working mode, and different application scenes or environmental conditions can be automatically matched by switching between different working modes.

According to some implementations of the first aspect of the present disclosure, the lidar has a normal working mode, in which the sub-fields of the plurality of laser transceiver module groups at least partially overlap each other to form a stitched field of view of the lidar, so as to use a specific number of laser transceiver module groups to achieve the balanced scanning performance of the lidar.

According to some implementations of the first aspect of the present disclosure, the lidar has an enhanced working mode, in which more laser transceiver module groups can be allocated to a specific area or key area for scanning by adjusting the orientations of the laser transceiver module groups using the orientation adjustment device, thereby obtaining an increased stitched field of view, vertical-axis angular resolution and/or horizontal angular resolution in the specific area or key area.

That is to say, for example, in the normal working mode, 30% of the laser transceiver module groups cover or at least partially cover the specific area or key area for scanning, while in the enhanced working mode, a greater number of laser transceiver module groups, such as 40%, 50% or even 60% or more of the laser transceiver module groups, are allocated to the specific area or key area for scanning, thereby enhancing the scanning frequency and resolution of the lidar in these areas. Of course, the field of view and scanning orientation or other characteristic parameters of the lidar can also be changed by the enhanced working mode, so as to make the lidar match the specific working environment conditions and requirements simply, quickly and flexibly.

According to some implementations of the first aspect of the present disclosure, the lidar is equipped with a control module, and the control module is configured for controlling transmission and reception of laser light, and obtaining characteristic information of the target object through post-signal data processing.

According to some implementations of the first aspect of the present disclosure, the control module can control the orientation adjustment device according to the obtained characteristic information of the target object, so that the orientations of the plurality of laser transceiver module groups relative to a reflective surface of the scanning module can be automatically adjusted in a closed-loop control manner, thereby dynamically and automatically changing the stitched field of view and/or scanning resolution of the lidar.

According to some implementations of the first aspect of the present disclosure, in each laser transceiver module group, the laser transmitting end and the laser receiving end integrated in the laser transceiver module group are arranged in a common structural unit housing in close proximity and side by side.

According to some implementations of the first aspect of the present disclosure, the lidar comprises two laser transceiver module groups, and the two laser transceiver module groups are arranged symmetrically/asymmetrically with respect to a central axis of the scanning module.

According to some implementations of the first aspect of the present disclosure, the lidar comprises four laser transceiver module groups, and the four laser transceiver module groups are arranged symmetrically/asymmetrically with respect to the central axis of the scanning module.

According to some implementations of the first aspect of the present disclosure, the lidar further comprises a spare laser transceiver module group, which, when a working laser transceiver module group fails or is externally damaged, can be put into use immediately and replace the faulty or externally damaged laser transceiver module group.

According to some implementations of the first aspect of the present disclosure, the lidar further comprises a fault detection device for detecting a working state of the laser transceiver module group, and the control module detects or monitors the functionality of the working laser transceiver module group by means of the fault detection device.

According to some implementations of the first aspect of the present disclosure, the lidar has an emergency working mode, wherein when it is detected that the laser transceiver module group fails or is externally damaged, it is switched to the emergency working mode of the lidar, and the spare laser transceiver module group is put into use and replaces the faulty or externally damaged laser transceiver module group.

According to some implementations of the first aspect of the present disclosure, a scanning component of the scanning module is a rotating scanning component.

According to some implementations of the first aspect of the present disclosure, the scanning component of the scanning module comprises a double-faceted mirror, a multifaceted prism, or an oscillating mirror. By using the double-faceted mirror, the multifaceted prism, the different-faceted prism or the oscillating mirror as a rotating scanning component, the lidar can have a larger clear aperture, which can improve the utilization rate of laser energy, and at the same time increase the receiving aperture, facilitating the increase of the ranging distance.

According to some implementations of the first aspect of the present disclosure, different areas of the reflective surface of the rotating scanning component of the scanning module constitute a transmission scanning module and a reception scanning module, respectively, wherein the reflective surface area used as the transmission scanning module is configured for reflecting the laser beam emitted by the laser transmitting end to the target object, and the reflective surface area used as the reception scanning module is configured for receiving and guiding the laser beam reflected from the target object, and changing its direction to the laser receiving end.

According to some implementations of the first aspect of the present disclosure, the scanning component of the scanning module comprises a different-faceted prism, and wherein included angles between reflective side surfaces of the different-faceted prism and a central axis are different from each other and match each other, so that sub-fields of view correspondingly formed by each of the reflective side surfaces at least partially overlap each other, thereby forming a stitched field of view of the lidar.

According to some implementations of the first aspect of the present disclosure, the different-faceted prism is configured as a different-faceted quadrangular prism.

According to a second aspect of the present disclosure, a detection method for a lidar is further proposed, wherein the lidar comprises a laser transmitting end, a scanning module and a laser receiving end, comprising

- configuring a laser of the laser transmitting end for emitting a laser beam for detecting a target object;
- configuring the scanning module for guiding the laser beam emitted by the laser to scan the target object, and receiving and guiding the laser beam reflected from the target object; and
- configuring a detector of the laser receiving end for receiving the laser beam guided by the scanning module and reflected from the target object;
- integrating at least one laser transmitting end and at least one laser receiving end into a laser transceiver module group configured as a separate structural unit, and arranging a plurality of laser transceiver module groups in a distributed manner relative to the scanning module, and forming an at least partially stitched field of view of the lidar by sub-fields of view correspondingly formed by the plurality of laser transceiver module groups.

The beneficial technical effects described above for the lidar and its corresponding improvement technical measures are also applicable to the detection method for the lidar. For details, please refer to the corresponding description sections.

According to some implementations of the second aspect of the present disclosure, the laser transmitting end further comprises a transmitting lens group, the transmitting lens group has a laser shaping module, and the laser shaping module is configured for shaping the laser beam emitted by the laser.

According to some implementations of the second aspect of the present disclosure, a collimator and a homogenizer are sequentially arranged in the laser shaping module along an optical axis of the laser beam.

According to some implementations of the second aspect of the present disclosure, the laser shaping module is configured to shape the laser beam emitted by the laser transmitting end into a linear light spot.

According to some implementations of the second aspect of the present disclosure, the scanning module comprises a transmission scanning module and a reception scanning module, wherein the transmission scanning module is configured for reflecting the laser beam emitted by the laser transmitting end to the target object, and the reception scanning module is configured for receiving and guiding the laser beam reflected from the target object to the laser receiving end.

According to some implementations of the second aspect of the present disclosure, the laser receiving end further has a receiving lens group, and the receiving lens group is configured for receiving and transmitting the laser beam guided by the scanning module and reflected from the target object, and converging the reflected laser beam onto the detector of the laser receiving end.

According to some implementations of the second aspect of the present disclosure, included angles between the laser beams emitted by the laser transmitting ends of the plurality of laser transceiver module groups and a reflective surface of the scanning module are different from each other, so that the plurality of laser transceiver module groups separately form sub-fields of view with different orientations and at least partially overlapping each other.

According to some implementations of the second aspect of the present disclosure, the lidar is equipped with a control module, wherein the control module is configured for controlling transmission and reception of laser light, and obtaining characteristic information of the target object through post-signal data processing.

According to some implementations of the second aspect of the present disclosure, the lidar further comprises an orientation adjustment device for adjusting orientations of the laser transceiver module groups, and the control module is configured for controlling the orientation adjustment device so as to adjust the orientations of the plurality of laser transceiver module groups relative to a reflective surface of the scanning module, thereby changing the stitched field of view and/or scanning resolution of the lidar.

According to some implementations of the second aspect of the present disclosure, the control module is configured for changing the stitched field of view and/or scanning resolution of the lidar in a vertical-axis direction and/or a horizontal direction.

According to some implementations of the second aspect of the present disclosure, the orientation adjustment device comprises an actuator, wherein the control module is disposed to control the actuator for driving the orientation adjustment device, so as to achieve the orientation adjustment of the laser transceiver module group.

According to some implementations of the second aspect of the present disclosure, the control module is configured to control the orientation adjustment device assigned to each laser transceiver module group according to a predetermined working mode, and wherein the control module can automatically match different application scenes or environmental conditions by switching between different working modes.

According to some implementations of the second aspect of the present disclosure, the control module can be switched to a normal working mode, in which the sub-fields of the plurality of laser transceiver module groups at least partially overlap each other to form a stitched field of view of the lidar, so as to use a specific number of laser transceiver module groups to achieve the balanced scanning performance of the lidar.

According to some implementations of the second aspect of the present disclosure, the control module can be switched to an enhanced working mode, in which a greater number of laser transceiver module groups than that in the normal working mode can be allocated to a specific area or key area for scanning by adjusting the orientations of the laser transceiver module groups using the orientation adjustment device, thereby obtaining an increased stitched field of view, vertical-axis angular resolution and/or horizontal angular resolution in the specific area or key area.

According to some implementations of the second aspect of the present disclosure, the control module is configured to control the orientation adjustment device according to the obtained characteristic information of the target object, so that the orientations of the plurality of laser transceiver module groups relative to a reflective surface of the scanning module can be automatically adjusted in a closed-loop control manner, thereby dynamically and automatically changing the stitched field of view and/or scanning resolution of the lidar.

According to some implementations of the second aspect of the present disclosure, in each laser transceiver module group, the laser transmitting end and the laser receiving end integrated in the laser transceiver module group are arranged in a common structural unit housing in close proximity and side by side.

According to some implementations of the second aspect of the present disclosure, the lidar comprises two laser transceiver module groups, and the two laser transceiver module groups are arranged symmetrically/asymmetrically with respect to a central axis of the scanning module.

According to some implementations of the second aspect of the present disclosure, the lidar comprises four laser transceiver module groups, and the four laser transceiver module groups are arranged symmetrically/asymmetrically with respect to the central axis of the scanning module.

According to some implementations of the second aspect of the present disclosure, the lidar further comprises a spare laser transceiver module group, and when a working laser transceiver module group fails or is externally damaged, the spare laser transceiver module group is put into use immediately and replaces the faulty or externally damaged laser transceiver module group.

According to some implementations of the second aspect of the present disclosure, the lidar further comprises a fault detection device for detecting a working state of the laser transceiver module group, and the control module is configured to detect or monitor the functionality of the working laser transceiver module group by means of the fault detection device.

According to some implementations of the second aspect of the present disclosure, the control module can be switched to an emergency working mode, wherein when it is detected that the laser transceiver module group fails or is externally damaged, it is switched to the emergency working mode of the lidar, and the spare laser transceiver module group is put into use and replaces the faulty or externally damaged laser transceiver module group.

According to some implementations of the second aspect of the present disclosure, a scanning component of the scanning module is a rotating scanning component.

According to some implementations of the second aspect of the present disclosure, the scanning component of the scanning module comprises a double-faceted mirror, a multifaceted prism, or an oscillating mirror.

According to some implementations of the second aspect of the present disclosure, different areas of the reflective surface of the rotating scanning component of the scanning module constitute a transmission scanning module and a reception scanning module, respectively, wherein the reflective surface area used as the transmission scanning module is configured for reflecting the laser beam emitted by the laser transmitting end to the target object, and the reflective surface area used as the reception scanning module is configured for receiving and guiding the laser beam reflected from the target object, and changing its direction to the laser receiving end.

According to some implementations of the second aspect of the present disclosure, the scanning component of the scanning module comprises a different-faceted prism, and wherein included angles between reflective side surfaces of the different-faceted prism and a central axis are different from each other and match each other, so that sub-fields of view correspondingly formed by each of the reflective side surfaces at least partially overlap each other, thereby forming a stitched field of view of the lidar.

According to some implementations of the second aspect of the present disclosure, the proximity different-faceted prism is configured as a different-faceted quadrangular prism.

One of the objectives of the present disclosure is also to propose a lidar and a manufacturing method for the lidar, which not only achieve the high resolution of the lidar, but also have a compact structure, lower manufacturing cost, and easy assembly and maintenance.

Therefore, according to a third aspect of the present disclosure, a lidar is proposed, comprising:

a laser transmitting end, wherein the laser transmitting end has a laser, and the laser is configured for emitting a laser beam for detecting a target object;

a scanning module, wherein the scanning module is configured for guiding the laser beam emitted by the laser to scan the target object, and receiving and guiding the laser beam reflected from the target object; and a laser receiving end, wherein the laser receiving end has a detector, and the detector is configured for receiving the laser beam guided by the scanning module and reflected from the target object;

wherein a scanning component of the scanning module is constructed as a rotatable plate-shaped double-faceted mirror.

According to the technical solution proposed in the third aspect of the present disclosure, the rotatable plate-shaped double-faceted mirror is used as the scanning component of the scanning module, so that the scanning component is lighter in weight, and the light output aperture and the receiving beam aperture are larger, and high-speed scanning of a large range, for example, in the horizontal direction, can thus be achieved.

According to some implementations of the third aspect of the present disclosure, at least one laser transmitting end and at least one laser receiving end are integrated into a laser transceiver module group configured as a separate structural unit.

According to some implementations of the third aspect of the present disclosure, the lidar further comprises an isolation mechanism, and the isolation mechanism separates a reflective surface of the plate-shaped double-faceted mirror into a transmission scanning area and a reception scanning area.

According to some implementations of the third aspect of the present disclosure, the isolation mechanism isolates the laser transmitting end and the laser receiving end of the laser transceiver module group configured as the separate structural unit.

According to the third aspect of the present disclosure, the transmission optical path and the reception optical path are optimally partitioned by disposing the isolation mechanism. Compared with lidars with non-common optical paths, for example, a scanning component can be simply shared; compared with scanning systems with common optical paths, the laser receiving end is not affected by the laser beam emitted by the laser and the stray light generated by the scanning component, which can effectively improve the working performance of the lidar.

According to some implementations of the third aspect of the present disclosure, the isolation mechanism is made of a material capable of blocking stray light.

According to some implementations of the third aspect of the present disclosure, the isolation mechanism is composed of a circular rotating partition and a fixed partition having a circular hole, and wherein the fixed partition is fixed on a housing of the lidar, and the rotating partition can be embedded in the circular hole of the fixed partition and rotated therein.

According to some implementations of the third aspect of the present disclosure, the rotating partition has an opening, and the plate-shaped double-faceted mirror extends through the opening of the rotating partition and is fixed with the rotating partition.

According to some implementations of the third aspect of the present disclosure, the rotating partition is composed of two semicircular plates, and the two semicircular plates are connected to two sides of the plate-shaped double-faceted mirror and spliced together to form a complete circle.

According to some implementations of the third aspect of the present disclosure, the fixed partition fixed on the housing of the lidar extends across the laser transceiver module group arranged in an interior space of the housing of the lidar, and isolates the laser transmitting end and the laser receiving end of the laser transceiver module group configured as the separate structural unit.

According to some implementations of the third aspect of the present disclosure, the plate-shaped double-faceted mirror can drive the rotating partition to rotate together, and wherein the transmission scanning area and the reception scanning area of the plate-shaped double-faceted mirror are respectively formed on one side of the rotating partition.

According to some implementations of the third aspect of the present disclosure, the fixed partition and the rotating partition embedded in the circular hole of the fixed partition form a partition plane, which divides an interior space of the housing of the lidar into two chambers, and wherein the transmission scanning area of the plate-shaped double-faceted mirror and the laser transmitting end of the laser transceiver module group are disposed in one of the chambers, and the reception scanning area of the plate-shaped double-faceted mirror and the laser receiving end of the laser transceiver module group are disposed in the other chamber.

According to some implementations of the third aspect of the present disclosure, the partition plane is perpendicular to the reflective surface of the plate-shaped double-faceted mirror.

According to some implementations of the third aspect of the present disclosure, the plate-shaped double-faceted mirror is fixed on a base, and the base can be driven to rotate by an electric motor.

According to some implementations of the third aspect of the present disclosure, the isolation mechanism further comprises a bottom plate, and the bottom plate divides the interior space of the housing of the lidar to obtain a separate equipment chamber, and wherein the electric motor for driving the base to rotate is disposed in the separate equipment chamber.

According to some implementations of the third aspect of the present disclosure, the laser transmitting end further has a laser shaping module, which shapes the laser beam emitted by the laser into linear scanning laser light, and the plate-shaped double-faceted mirror reflects the linear scanning laser light and scans the target object.

According to the present disclosure, the laser beam emitted by the laser is shaped into the linear scanning laser light, and the linear scanning laser light is used to scan the target object. In combination with the corresponding proposed optical, mechanical and electrical improvement measures, the vertical angular resolution of the lidar can be significantly improved at a simple and low cost on the premise of not increasing the number of lasers of the lidar.

According to some implementations of the third aspect of the present disclosure, the lidar is equipped with a control module, and the control module is configured for controlling transmission and reception of laser light, and obtaining characteristic information of the target object through post-signal data processing.

According to some implementations of the third aspect of the present disclosure, the control module comprises:

a laser driving module for controlling the laser of the laser transmitting end to emit laser light;

a signal processing module for processing a detection signal received by the detector of the laser receiving end; and a main control module for controlling the laser driving module and the signal processing module, and using the signal processing module to calculate the characteristic information of the target object.

According to a fourth aspect of the present disclosure, a manufacturing method for a lidar is proposed, wherein the lidar comprises a laser transmitting end, a scanning module and a laser receiving end, comprising

- configuring a laser of the laser transmitting end for emitting a laser beam for detecting a target object;
- configuring the scanning module for guiding the laser beam emitted by the laser to scan the target object, and receiving and guiding the laser beam reflected from the target object; and
- configuring a detector of the laser receiving end for receiving the laser beam guided by the scanning module and reflected from the target object; and
- constructing a scanning component of the scanning module as a rotatable plate-shaped double-faceted mirror.

The beneficial technical effects described above for the lidar and its corresponding improvement technical measures are also applicable to the manufacturing method for the lidar. For details, please refer to the corresponding description sections.

According to some implementations of the fourth aspect of the present disclosure, an isolation mechanism is provided to separate a reflective surface of the plate-shaped double-faceted mirror into a transmission scanning area and a reception scanning area while isolating the laser transmitting end and the laser receiving end of a laser transceiver module group configured as a separate structural unit.

According to some implementations of the fourth aspect of the present disclosure, the isolation mechanism is composed of a circular rotating partition and a fixed partition having a circular hole, wherein the fixed partition is fixed on a housing of the lidar, and during assembly, the rotating partition is inserted into the circular hole of the fixed partition, and the rotating partition can be rotated in the circular hole of the fixed partition, and wherein the plate-shaped double-faceted mirror can drive the rotating partition to rotate together.

One of the objectives of the present disclosure is also to propose a lidar and a manufacturing method for the lidar, which not only achieve the high resolution of the lidar, but also have a compact structure, lower manufacturing cost, and easy assembly and maintenance.

Therefore, according to a fifth aspect of the present disclosure, a lidar is proposed, comprising:

a laser transmitting end, wherein the laser transmitting end has a laser, and the laser is configured for emitting a laser beam for detecting a target object;

a scanning module, wherein the scanning module is configured for guiding the laser beam emitted by the laser to scan the target object, and receiving and guiding the laser beam reflected from the target object; and a laser receiving end, wherein the laser receiving end has a detector, and the detector is configured for receiving the laser beam guided by the scanning module and reflected from the target object;

wherein a scanning component of the scanning module is constructed as a rotatable prism.

According to the technical solution in the fifth aspect of the present disclosure, the rotatable plate-shaped double-faceted mirror is used as the scanning component of the scanning module, so that the scanning component is lighter in weight, and the light output aperture and the receiving beam aperture are larger, and high-speed scanning of a large range, for example, in the horizontal direction, can thus be achieved.

According to some implementations of the fifth aspect of the present disclosure, at least one laser transmitting end and at least one laser receiving end are integrated into a laser transceiver module group configured as a separate structural unit, and wherein the lidar comprises at least one laser transceiver module group.

According to some implementations of the fifth aspect of the present disclosure, the lidar further comprises an isolation mechanism, and the isolation mechanism separates a reflective surface of the rotatable prism into a transmission scanning area and a reception scanning area.

According to some implementations of the fifth aspect of the present disclosure, the isolation mechanism isolates the laser transmitting end and the laser receiving end of the laser transceiver module group configured as the separate structural unit.

According to the present disclosure, the transmission optical path and the reception optical path are optimally partitioned by disposing the isolation mechanism. Compared with lidars with non-common optical paths, for example, a scanning component can be simply shared; compared with scanning systems with common optical paths, the laser receiving end is not affected by the laser beam emitted by the laser and the stray light generated by the scanning component, which can effectively improve the working performance of the lidar.

According to some implementations of the fifth aspect of the present disclosure, the isolation mechanism is made of a material capable of blocking stray light.

According to some implementations of the fifth aspect of the present disclosure, the isolation mechanism is composed of a circular rotating partition and a fixed partition having a circular hole, and wherein the fixed partition is fixed on a housing of the lidar, and the rotating partition can be embedded in the circular hole of the fixed partition and rotated therein.

According to some implementations of the fifth aspect of the present disclosure, the rotating partition has an opening, and the plate-shaped double-faceted mirror extends through the opening of the rotating partition and is fixed with the rotating partition.

According to some implementations of the fifth aspect of the present disclosure, the rotating partition is composed of two semicircular plates, and the two semicircular plates are connected to two sides of the rotatable prism and spliced together to form a complete circle.

According to some implementations of the fifth aspect of the present disclosure, the fixed partition fixed on the housing of the lidar extends across the laser transceiver module group arranged in an interior space of the housing of the lidar, and isolates the laser transmitting end and the laser receiving end of the laser transceiver module group configured as the separate structural unit.

According to some implementations of the fifth aspect of the present disclosure, the rotatable prism can drive the rotating partition to rotate together, and wherein the transmission scanning area and the reception scanning area of the rotatable prism are respectively formed on one side of the rotating partition.

According to some implementations of the fifth aspect of the present disclosure, the fixed partition and the rotating partition embedded in the circular hole of the fixed partition form a partition plane, which divides an interior space of the housing of the lidar into two chambers, and wherein the transmission scanning area of the rotatable prism and the laser transmitting end of the laser transceiver module group are disposed in one of the chambers, and the reception scanning area of the rotatable prism and the laser receiving end of the laser transceiver module group are disposed in the other chamber.

According to some implementations of the fifth aspect of the present disclosure, the partition plane is perpendicular to the reflective surface of the rotatable prism.

According to some implementations of the fifth aspect of the present disclosure, the rotatable prism is fixed on a base, and the base can be driven to rotate by an electric motor.

According to some implementations of the fifth aspect of the present disclosure, the isolation mechanism further comprises a bottom plate, and the bottom plate divides the interior space of the housing of the lidar to obtain a separate equipment chamber, and wherein the electric motor for driving the base to rotate is disposed in the separate equipment chamber.

According to some implementations of the fifth aspect of the present disclosure, the laser transmitting end further has a laser shaping module, which shapes the laser beam emitted by the laser into linear scanning laser light, and the rotatable prism reflects the linear scanning laser light and scans the target object.

According to the fifth aspect of the present disclosure, the laser beam emitted by the laser is shaped into the linear scanning laser light, and the linear scanning laser light is used to scan the target object. In combination with the corresponding proposed optical, mechanical and electrical improvement measures, the vertical angular resolution of the lidar can be significantly improved at a simple and low cost on the premise of not increasing the number of lasers of the lidar.

According to some implementations of the fifth aspect of the present disclosure, the lidar is equipped with a control module, and the control module is configured for controlling transmission and reception of laser light, and obtaining characteristic information of the target object through post-signal data processing.

According to some implementations of the fifth aspect of the present disclosure, the control module comprises:

a laser driving module for controlling the laser of the laser transmitting end to emit laser light;

a signal processing module for processing a detection signal received by the detector of the laser receiving end; and a main control module for controlling the laser driving module and the signal processing module, and using the signal processing module to calculate the characteristic information of the target object.

According to some implementations of the fifth aspect of the present disclosure, the laser transceiver module group comprises exactly two laser transmitting ends and one laser receiving end.

According to a sixth aspect of the present disclosure, a manufacturing method for a lidar is proposed, wherein the lidar comprises a laser transmitting end, a scanning module and a laser receiving end, comprising

- configuring a laser of the laser transmitting end for emitting a laser beam for detecting a target object;
- configuring the scanning module for guiding the laser beam emitted by the laser to scan the target object, and receiving and guiding the laser beam reflected from the target object; and
- configuring a detector of the laser receiving end for receiving the laser beam reflected from the target object and guided by the scanning module; and
- constructing a scanning component of the scanning module as a rotatable prism.

The beneficial technical effects described above for the lidar and its corresponding improvement technical measures are also applicable to the manufacturing method for the lidar. For details, please refer to the corresponding description sections.

According to some implementations of the sixth aspect of the present disclosure, an isolation mechanism is provided to separate a reflective surface of the rotatable prism into a transmission scanning area and a reception scanning area while isolating the laser transmitting end and the laser receiving end of a laser transceiver module group configured as a separate structural unit.

According to some implementations of the sixth aspect of the present disclosure, the isolation mechanism is composed of a circular rotating partition and a fixed partition having a circular hole, wherein the fixed partition is fixed on a housing of the lidar, and during assembly, the rotating partition is inserted into the circular hole of the fixed partition, and the rotating partition can be rotated in the circular hole of the fixed partition, and wherein the rotatable prism can drive the rotating partition to rotate together.

BRIEF DESCRIPTION OF THE DRAWINGS

The technical solutions of the present disclosure will be further described in detail below in conjunction with accompanying drawings and embodiments. It should be pointed out that the accompanying drawings are only exemplarily given for the purpose of explanation and description, and are used to illustrate the concepts such as the working principle and composition structure of the lidar described herein; and they are neither necessarily drawn in scale nor intended to limit the concepts of the present disclosure.

DETAILED DESCRIPTION OF THE EMBODIMENTS

Figure 1:
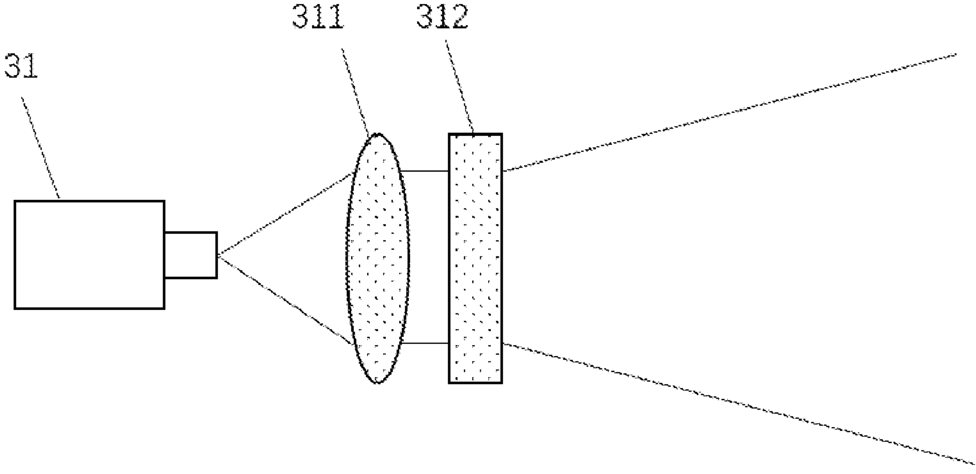
FIG. 1 is a schematic diagram of a laser transmitting end according to some implementations of the present disclosure, wherein the laser transmitting end includes a laser and a shaping module.

Implementations or embodiments in the following description are given by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present disclosure.

It should be understood by those skilled in the art that in the disclosure of the present disclosure, the orientation or positional relationship indicated by the terms “longitudinal”, “transverse”, “upper”, “lower”, “front”, “rear”, “left”, “right”, “vertical”, “vertical-axis”, “horizontal”, “top”, “bottom”, “inside”, “outside”, etc. is based on the orientation or positional relationship shown in the drawings, which is merely for the convenience of describing the present disclosure and simplifying the description, and does not indicate or imply that the mentioned device or element must have a particular orientation and be constructed and operated in the particular orientation. Therefore, the above terms cannot be construed as a limitation of the present disclosure.

In some implementations according to the present disclosure, a lidar 1 includes a laser transmitting end 3, a scanning module 4 and a laser receiving end 5. The laser transmitting end 3 has a laser 31, and the laser 31 is configured for emitting a laser beam for detecting a target object. The laser receiving end 5 has a detector, and the detector is configured for receiving the laser beam guided by the scanning module 4 and reflected from the target object. The scanning module 4 is configured for guiding the laser beam emitted by the laser 31 to scan the target object, and/or receiving and guiding the laser beam reflected from the target object.

The control module 6 is configured for controlling transmission and reception of laser light, and obtaining characteristic information of the target object through post-signal data processing. In some embodiments, according to actual application requirements, the control module 6 may be configured as an independent electronic device relative to the lidar 1, and is separated from the lidar body in structure and arrangement position, thereby achieving independent design, manufacture and installation of the control module 6, or achieving remote control and data analysis of the lidar 1, for example. In other embodiments, the control module 6 may also optionally be configured as an integral part of the lidar 1, for example, arranged in a lidar housing or integrated with an optoelectronic device of the lidar 1, so that during production and installation of the lidar, a complete lidar system can be obtained, for example.

At least one laser transmitting end 3 and at least one laser receiving end 5 are integrated into a laser transceiver module group 2 configured as a separate structural unit, wherein the lidar 1 includes a plurality of laser transceiver module groups 2, the plurality of laser transceiver module groups 2 are arranged in a distributed manner relative to the scanning module 4, and a field of view, which as a whole is at least partially stitched, of the lidar 1 is formed by sub-fields of view correspondingly formed by the plurality of laser transceiver module groups 2. According to some implementations of the present disclosure, for example, the light beam is shaped to be linear, and a one-dimensional scanning module 4 can be used to achieve three-dimensional scanning, reducing the requirements for the scanning component and reducing the cost of the whole machine. Through the plurality of laser transceiver module groups 2, the detection field of view is stitched, achieving a larger horizontal field-of-view angle, wherein the central field of view has an overlapping part, and thus the detection accuracy of key test areas can be improved.

FIG. 1 is a schematic diagram of a laser transmitting end 3 according to some implementations, wherein the laser transmitting end 3 includes a laser 31 and a laser shaping module. As shown in the figure, the laser transmitting end 3 has a laser 31, and the laser 31 is configured for emitting a laser beam for detecting a target object.

The laser 31 may be selected from solid-state lasers or semiconductor lasers, such as fiber lasers. However, the technical solutions proposed by the present disclosure include but are not limited to the aforementioned laser types, and any device capable of generating and emitting laser light may be used. The concepts of the present disclosure are not limited to the form described herein.

In addition, the laser transmitting end 3 also has a transmitting lens group. In the embodiment shown, the transmitting lens group is configured as a laser shaping module. The laser shaping module transmits the laser beam emitted by the laser 31, and achieves the functions of collimating, homogenizing, and shaping the laser beam. According to different design functions and purposes, one or more of the three functions of collimation, homogenization, and shaping may be used to finally form, for example, point-shaped or linear light spots.

In the implementation shown in FIG. 1, the laser shaping module is composed of a collimator 311 and a homogenizer 312. The laser beam projected by the laser 31 of the laser transmitting end 3 is incident on the collimator 311 in a relatively divergent manner, and the parallel light is emitted from the collimator 311 and projected to the homogenizer 312, and continues to emit after passing through the homogenizer 312. The form of the laser shaping module can be diversified, including but not limited to the combination of the collimator 311 and the homogenizer 312 shown. As long as optical components and their combination can achieve the corresponding shaping purpose, they can be used as a laser shaping module in the sense of the present disclosure. The concepts of the present disclosure are not limited to the form described herein.

In addition, in some implementations of the present disclosure, the laser 31 and the laser shaping module can either be integrated, or can be configured as separate components to be installed separately. The concepts of the present disclosure are not limited to the form described herein.

Figure 2:
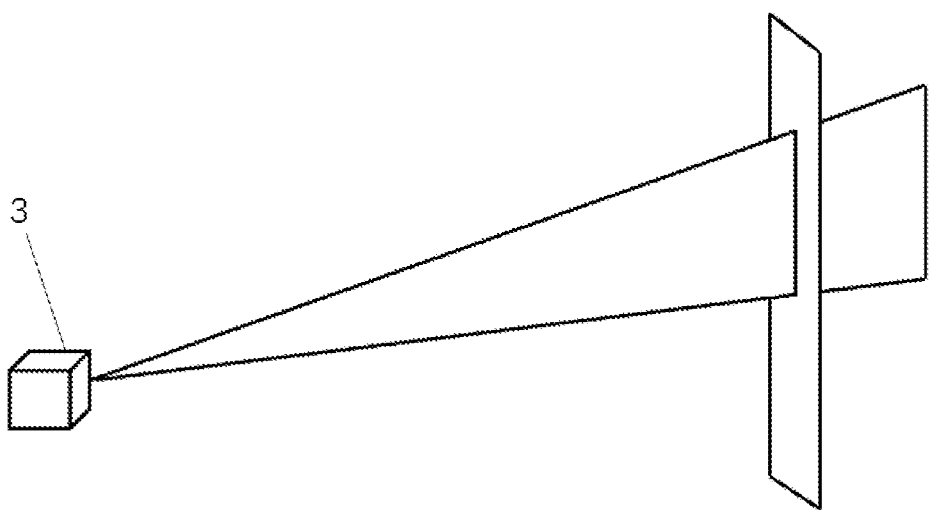
FIG. 2 is a schematic diagram of the laser transmitting end emitting a linear light spot according to some implementations of the present disclosure, wherein a laser beam is shaped into the linear light spot by the shaping module of the laser transmitting end.

In the implementation shown in FIG. 2, the laser transmitting end 3 emits a linear light spot. Here, the laser shaping module of the laser transmitting end 3 shapes the laser beam emitted by the laser 31 of the laser transmitting end 3 into a linear light spot, i.e., linear scanning laser light. Therefore, the laser beam is incident onto a reflective surface of the scanning module 4 in the form of a linear light spot, as shown in FIG. 2. Of course, after the linear light spot is reflected by the reflective surface of the scanning module 4, it still scans the target object in the form of a linear light spot. By shaping the light beam into a linear shape, using the technical solution proposed in the present disclosure, three-dimensional scanning can be achieved by using the one-dimensional scanning module 4, reducing the requirements for the scanning component and reducing the cost of the whole machine.

The laser receiving end 5 has a detector, and the detector is configured for receiving the laser beam guided by the scanning module 4 and reflected from the target object. For example, as can be seen most clearly in FIG. 4, the laser beam is emitted by the laser transmitting end 3 of the lidar 1, and after being reflected by the reflective surface of the scanning module 4, the laser beam is projected to the target object and scans it. After that, the laser beam reflected from the target object first is incident onto the reflective surface of the scanning module 4, and then is received and detected by the laser receiving end 5 of the lidar 1 after being reflected.

Here, a laser signal can be detected using a photoelectric type detector or a photothermal type detector, including, for example, an avalanche photodiode, a single photon detector, or a photomultiplier tube. However, in the technical solutions according to the present disclosure, the detector includes but is not limited to the aforementioned types. Any detector capable of converting a laser signal into an electrical signal can be used in the technical solutions proposed by the present disclosure. The concepts of the present disclosure are not limited to the form described herein.

According to some implementations of the present disclosure, the laser receiving end 5 further has a receiving lens group. For example, the receiving lens group is disposed upstream of the detector along the propagation direction of the laser beam, so that the receiving lens group can receive and transmit the laser beam reflected from the target object and/or the laser beam reflected from the scanning module 4, and converge the reflected laser beam onto the detector of the laser receiving end 5.

According to the present disclosure, on the one hand, the scanning module 4 is configured for guiding the laser beam and changing the propagation direction and manner of the laser beam to scan the target object; on the other hand, the scanning module 4 is configured for changing the propagation direction and manner of the light beam reflected from the target object and guiding it to the receiving lens group of the laser receiving end 5 of the lidar 1.

According to some implementations of the present disclosure, the scanning module 4 includes a transmission scanning module and a reception scanning module, wherein the transmission scanning module is specially configured for reflecting the laser beam emitted by the laser transmitting end 3 to the target object, and the reception scanning module is specially configured for receiving and guiding the laser beam reflected from the target object, and changing its direction to the laser receiving end 5.

According to some implementations of the present disclosure, the scanning component of the scanning module 4 may include a double-faceted mirror, a multifaceted prism, a different-faceted prism, or an oscillating mirror. The laser beam emitted by the laser transmitting end 3 of the laser transceiver module group 2 forms an included angle with a rotation axis of the scanning component of the scanning module 4, or forms an included angle with the reflective surface of the scanning component of the scanning module 4. In particular, the included angles formed by the laser beams emitted by the lasers 31 of the laser transmitting ends 3 of the laser transceiver module groups 2 and the reflective surface of the scanning module 4 are different from each other, so the scanning subfields correspondingly formed by the laser transceiver module groups 2 partially overlap each other, thereby forming the stitched field of view of the lidar 1.

In some implementations, by appropriately matching the included angle formed by the laser beam emitted by the laser 31 of the laser transmitting end 3 of the laser transceiver module group 2 and the reflective surface of the scanning module 4, especially by adjusting the orientation of the laser transceiver module group 2 or changing the reflective surface angle or component structure of the scanning component of the scanning module 4, the stitching manners of the stitched field of view in a vertical-axis direction and/or the stitched field of view in a horizontal direction of the lidar 1 can be changed. Here, the vertical-axis direction refers to a direction perpendicular to the horizontal direction, i.e., a vertical direction or a plumb direction of the lidar in a normal working state.

Figure 3:
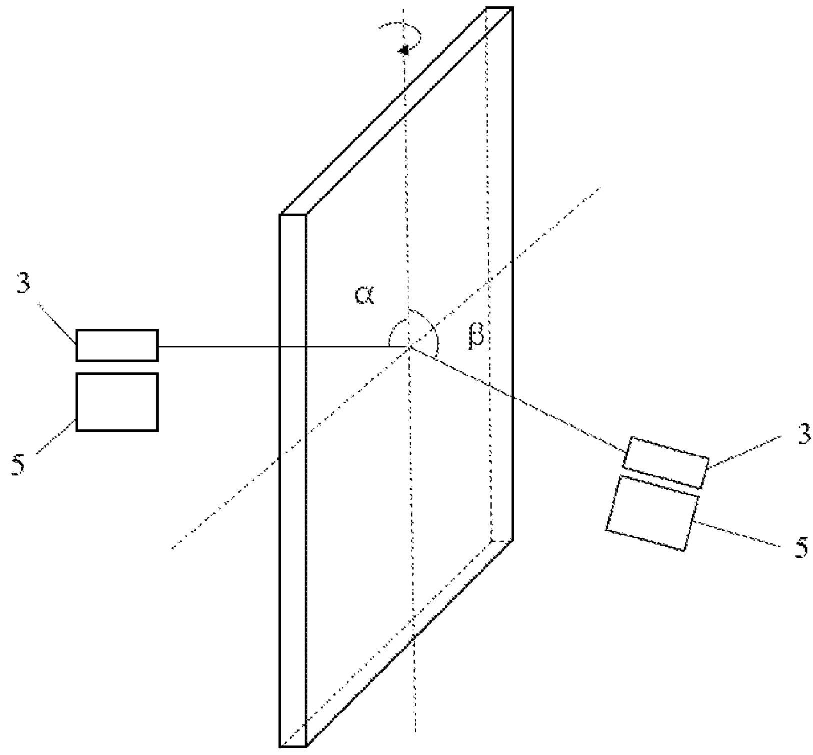
FIG. 3 is a schematic diagram of an included angle between a laser beam and a rotational axis of a scanning component of a scanning module according to some implementations of the present disclosure.

FIG. 3 is a schematic diagram of the included angle between the laser beam emitted by the laser transmitting end 3 of the laser transceiver module group 2 and the rotation axis of the scanning module 4 according to some implementations of the present disclosure. Here, the scanning component of the scanning module 4 is configured as double-faceted mirror, and the laser beams emitted by the lasers 31 of the laser transmitting ends 3 of two laser transceiver module groups 2 form angles α and β with the rotation axis of the double-faceted mirror, respectively.

The included angles α and β formed by the laser beams emitted by the lasers 31 of the laser transmitting ends 3 of the two laser transceiver module groups 2 and the rotation axes of the double-faceted mirror of the scanning module 4 can be different from each other, that is to say, the included angles formed by the laser beams emitted by the lasers 31 of the laser transmitting ends 3 of the two laser transceiver module groups 2 and the reflective surface of the double-faceted mirror of the scanning module 4 are different from each other. Therefore, as shown in FIG. 4, a sub-field of view A formed by one laser transceiver module group 2 that integrates the laser transmitting end 3 and the laser receiving end 5 and a sub-field of view B formed by the other laser transceiver module group 2 that integrates the laser transmitting end 3 and the laser receiving end 5 have an overlapping part, thereby forming the stitched field of view of the lidar 1 as a whole.

Figure 5:
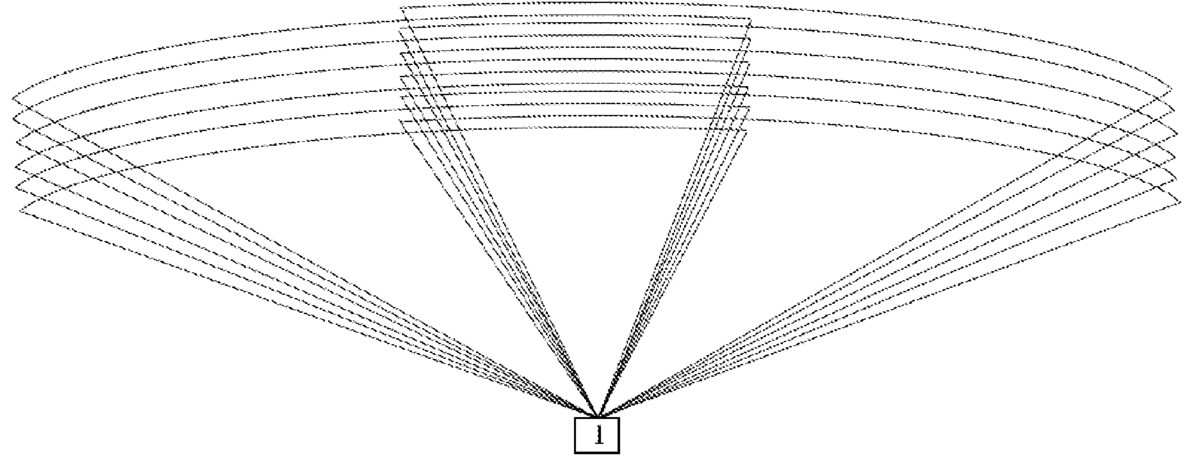
FIG. 5 is a schematic diagram of an angular resolution of an overlapping part with the field of view being stitched according to some implementations of the present disclosure.

As shown in FIG. 5, since the laser beams of the two laser transceiver module groups 2 are both scanned for the overlapping part, it is obvious that the resolution of the overlapping part is higher than that of the non-overlapping part. Also, due to the existence of the overlapping part, the lidar 1 generally forms a stitched field of view from the sub-fields of view of the laser transceiver module groups 2.

However, the scanning module 4 proposed in the present disclosure includes but is not limited to the aforementioned scanning component, but any optical device capable of changing the propagation direction of the laser beam can be used. The concepts of the present disclosure are not limited to the form described herein.

Figure 4:
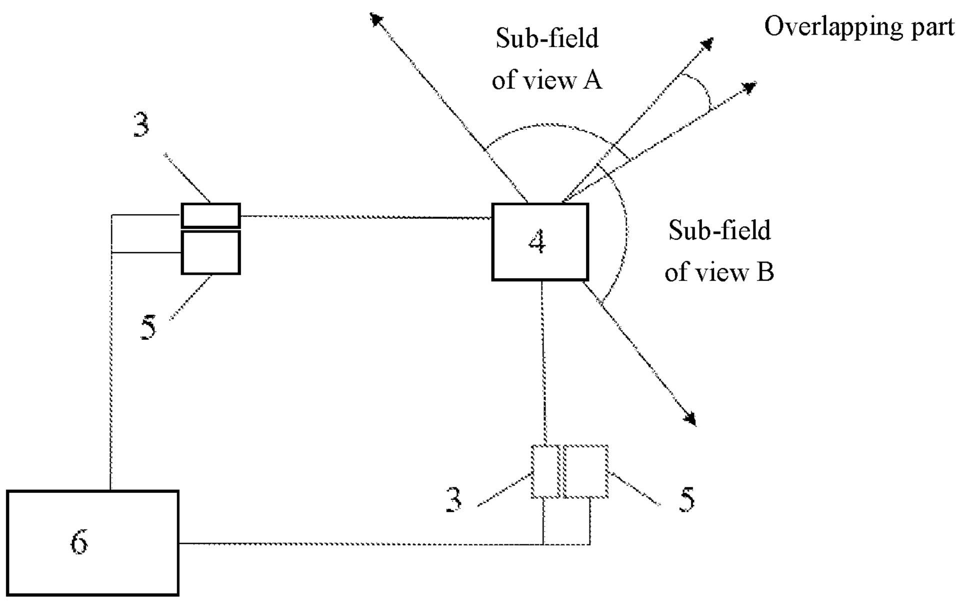
FIG. 4 is a system schematic diagram of a lidar according to some implementations of the present disclosure, wherein a stitched field of view is exemplarily represented.

According to some implementations of the present disclosure, the control module 6 is configured for controlling transmission and reception of laser light, and obtaining characteristic information of the target object through post-signal data processing, as shown in FIG. 4. The control module 6 may be configured as an independent electronic device relative to the lidar 1, and is separated from the lidar body in structure and arrangement position. Alternatively, the control module 6 may also optionally be configured as an integral part of the lidar 1.

The control module 6 can control the laser 31, so as to control the timing and manner of the laser 31 emitting the laser beam, etc. For example, the laser beam may be emitted from the laser 31 in a continuous manner or in a pulsed manner. Of course, the control module 6 may also be used to control the detector of the laser receiving end 5 of the lidar 1.

The control module 6 can control the detector for receiving the laser beam guided by the scanning module 4 and reflected from the target object, and perform post-signal data processing to analyze the characteristic information of the target object. Here, the characteristic information of the target object includes but is not limited to characteristic parameters such as the speed, position, and shape of the target object, and other parameters that can be derived or calculated therefrom.

For this reason, the control module 6 may include an integrated signal processing part for analyzing and processing photoelectric signal data of the reflected laser beam received by the detector, thereby obtaining the characteristic information of the target object. A separate signal processing module may also be provided for implementing corresponding signal processing and analysis functions.

The control module 6 may also control the scanning module 4, so that for example, for a rotating scanning component such as a double-faceted mirror, a multifaceted prism or a different-faceted prism, the rotational speed of the rotating scanning component can be controlled; or for an oscillating mirror, its vibration frequency or scanning angle can be controlled. The scanning component of the scanning module 4 includes a different-faceted prism, wherein the included angles between reflective side surfaces of the different-faceted prism and the central axis are different from each other and match each other, so that the sub-fields of view formed correspondingly by each of the reflective side surfaces at least partially overlap each other, thereby forming the stitched field of view of the lidar 1.

For example, a motor is provided for rotationally driving the rotating scanning component of the scanning module 4. In this regard, the control module 6 can be configured for controlling the starting, stopping and working modes of the motor, etc., especially for regulating the rotational speed of the motor.

According to some implementations of the present disclosure, at least one laser transmitting end 3 and at least one laser receiving end 5 are integrated into a laser transceiver module group 2, and the laser transceiver module group 2 is configured as a separate structural unit. For example, in each laser transceiver module group 2, the laser transmitting end 3 and the laser receiving end 5 integrated in the laser transceiver module group 2 are arranged in a common structural unit housing in close proximity and side by side. That is to say, a separate structural unit can be formed by integrating at least one laser transmitting end 3 and at least one laser receiving end 5 into a common laser transceiver module group housing.

It may also be considered that the separate laser transmitting end 3 and the separate laser receiving end 5 are connected side by side to each other to form a separate structural unit by means of mechanical connection. It may further be considered that the laser transmitting end 3 and the laser receiving end 5 are directly constructed in a common structural module, thereby forming a separate structural unit.

It should be pointed out here that the laser transmitting end 3 and the laser receiving end 5 may be in an up-down positional relationship, or a left-right positional relationship, or other positional relationship, all of which are within the scope of the concepts of the present disclosure. It is important here that the laser transmitting end 3 and the laser receiving end 5 integrated as the structural unit or the laser transceiver module group 2 can emit and receive the laser beam normally, respectively, without causing optical path interference between the laser transmitting end 3 and the laser receiving end 5 of one laser transceiver module group 2 or between the laser transmitting ends 3 and the laser receiving ends 5 of different laser transceiver module groups 2.

In some implementations, the lidar 1 includes a plurality of laser transceiver module groups 2, and the plurality of laser transceiver module groups 2 are arranged in a distributed manner relative to the scanning module 4, so that the sub-fields of view formed correspondingly by the plurality of laser transceiver module groups 2 form a field of view, which is at least partially mutually overlapped/stitched, of the lidar 1. Of course, according to the specific structure and functional requirements of the lidar 1, a specific number of laser transceiver module groups 2 can be selected, or the orientation relationship between the scanning module 4 and the plurality of laser transceiver module groups 2 or the orientation relationship between the plurality of laser transceiver module groups 2 may also be changed according to the needs of the application scenes. It is important that the mutual arrangement relationship of the plurality of laser transceiver module groups 2 and the mutual arrangement relationship between the plurality of laser transceiver module groups 2 and the scanning module 4 can smoothly achieve transmission and reception of the laser beams, and the plurality of laser transceiver module groups 2 can form mutually complementary subfields of view for the target object as needed, in particular a field of view that is at least partially stitched as a whole, such as shown in FIGS. 4 and 5.

In some implementations, the lidar 1 includes an even number of laser transceiver module groups 2, such as 2, 4, 6, 8, 10, 12 or even more laser transceiver module groups 2. These laser transceiver module groups 2 may be generally symmetrically distributed on both sides as separate structural units relative to the scanning module 4, respectively, so that an at least partially stitched overall field of view of the lidar 1 is formed in an overlapping manner by the sub-fields of view formed correspondingly by the plurality of laser transceiver module groups 2.

Of course, according to the application scenes and performance requirements of the lidar 1, it may also be considered that the laser transceiver module groups 2 are arranged asymmetrically with respect to the central axis of the scanning module 4, for example, so as to strengthen an important area or key area for scanning, or, for example, so as to deal with a special scanning angle range or change the scanning frequency/scanning angular resolution of a specific area in a targeted manner.

For example, in the case where the lidar 1 is provided with exactly two laser transceiver module groups 2, the two laser transceiver module groups 2 and the scanning module 4 may be arranged in a triangle. For example, the two laser transceiver module groups 2 and the scanning module 4 are located on vertices of an equilateral triangle, respectively.

For example, when the lidar 1 is provided with exactly four laser transceiver module groups 2, the four laser transceiver module groups 2 may be symmetrically arranged on both sides relative to the scanning component of the scanning module 4, for example, in a rectangular arrangement. It may be considered that the four laser transceiver module groups 2 are located at four corners of a rectangle, respectively, and the scanning component of the scanning module 4 can be arranged inside the rectangular shape as needed, for example, on the geometric center of the rectangle, namely, at the intersection of the two diagonals. Of course, for special requirements for the field-of-view size and/or scanning resolution, it may also be considered that the scanning component of the scanning module 4 is arranged outside this rectangular shape.

In some implementations, it may also be considered that the lidar 1 includes more than one odd number of laser transceiver module groups 2, such as 3, 5, 7, 9, 11 or even more laser transceiver module groups 2. These laser transceiver module groups 2 may be distributed asymmetrically on both sides relative to the scanning module 4 as separate structural units. Thereby, for a specific scanning area or key scanning area, the number of the associated laser transceiver module groups 2 can be increased in a targeted manner relative to other areas, improving the resolution and/or scanning frequency in such scanning area.

In some implementations, the working laser transceiver module group 2 may still be distributed symmetrically on both sides relative to the scanning module 4, and an extra laser transceiver module group may be used as a spare laser transceiver module group, which is only put into use as a safe redundant replacement device when the working laser transceiver module group fails or is damaged, it is, thereby ensuring the safe, reliable and uninterrupted work of the lidar 1.

In some implementations, a spare laser transceiver module group 2 may also be disposed separately, for example, for an important scanning range, so that when an individual working laser transceiver module group 2 fails or is damaged externally, it can immediately respond to replace the faulty or externally damaged laser transceiver module group 2 to ensure the continuous and uninterrupted scanning work of the lidar 1, so that the scanning monitoring of the target object will not be interrupted.

For this reason, the lidar 1 may be provided with a fault detection device for detecting the working state of the laser transceiver module group 2. The control module 6 detects or monitors the functionality of the working laser transceiver module group 2 by means of the fault detection device. Moreover, when it is detected that the laser transceiver module group 2 fails or externally damaged, it is switched to an emergency working mode of the lidar 1, and the spare laser transceiver module group 2 is put into use and replaces the faulty or externally damaged working laser transceiver module group 2. The detection of the functionality of the working laser transceiver module group 2 can be performed when the lidar 1 is started or suspended intermittently. For application scenes with high reliability requirements, a fault detection device may also be disposed to continuously monitor the laser transceiver module group 2.

In some implementations, each laser transceiver module group 2 may be integrated with different numbers of laser transmitting ends 3 and laser receiving ends 5. For example, in one laser transceiver module group 2, a plurality of laser transmitting ends 3 correspond to one laser receiving end 5; or one laser transmitting end 3 corresponds to a plurality of laser receiving ends 5; or one laser transmitting end 3 corresponds to one laser receiving end 5; or a plurality of laser transmitting ends 3 correspond to a plurality of laser receiving ends 5. By appropriately setting and matching the relationship between the number of laser transmitting ends 3 and the number of laser receiving ends 5, and reasonably setting the number of the laser transceiver module groups 2, it not only facilities flexible adjustment (especially, expansion) of the overall field of view of the lidar 1, but also helps to improve the scanning frequency, vertical-axis and horizontal angular resolution in the sub-field of view of a single laser transceiver module group 2, and the scanning frequency, vertical-axis and horizontal angular resolution in the mutually overlapped fields of view of the plurality of laser transceiver module groups 2 according to requirements.

In some implementations, the lidar 1 further includes an orientation adjustment device, which is configured for adjusting the orientation of the laser transceiver module group 2, especially the orientations of the laser transmitting end 3 and the laser receiving end 5 contained therein. For this reason, an actuator for adjusting the posture of the laser transceiver module group 2 may be provided. Through controlling the actuator for adjusting the posture of the laser transceiver module group 2 by the control module 6, the included angle of the laser beam emitted by the laser 31 of the laser transmitting end 3 of the laser transceiver module group 2 relative to the reflective surface of the scanning module 4 or the rotation axis of the scanning module 4 can be dynamically and automatically adjusted.

In some implementations, the control module 6 may coordinately control the actuators assigned to the laser transceiver module groups 2 according to a predetermined working mode, so that the control module 6 can automatically match different application scenes or environmental conditions by switching between different working modes, such as changing the scanning field of view of the lidar 1, increasing the scanning frequency, vertical-axis angular resolution and/or horizontal angular resolution of a specific scanning area or key scanning area, etc.

Here, it may be considered that each laser transceiver module group 2 is provided with a separate orientation adjustment device, so that individual targeted posture adjustment can be achieved for each laser transceiver module group 2. Alternatively, it may also be considered that a common orientation adjustment device is configured for all the laser transceiver module groups 2. It is also possible to group all the laser transceiver module groups 2, and a common orientation adjustment device is configured for each group of laser transceiver module groups 2, so that the overall or grouping control of all the laser transceiver module groups 2 can be achieved, and the adjustment of the scanning field of view, scanning frequency and/or scanning resolution, etc., can be achieved in a coordinated manner to meet requirements.

As the actuator for adjusting the posture of the laser transceiver module group, it may be considered to use an electric motor, a hydraulic actuator, a pneumatic actuator, a piezoelectric actuator or the like, as long as it can drive the orientation adjustment device according to the control signal sent by the control module 6, in other words, it can adjust the orientation of the laser transceiver module group 2.

In some implementations, an electric motor for driving the orientation adjustment device is especially included, wherein the control module 6 controls the electric motor for driving the orientation adjustment device, thereby achieving the orientation adjustment by driving the orientation adjustment device. In some implementations, the plurality of laser transceiver module groups 2 can individually adjust the orientation relative to the reflective surface of the scanning module 4 through the orientation adjustment device, thereby changing the stitched field of view and/or scanning resolution of the lidar 1 by adjusting the sub-fields of view formed correspondingly by the plurality of laser transceiver module groups 2.

By dynamically and automatically adjusting the included angle of the laser beam emitted by the laser 31 of the laser transmitting end 3 of the laser transceiver module group 2 relative to the reflective surface of the scanning module 4 or the rotation axis of the scanning module 4, the beneficial effects can be brought about, including the following beneficial effects that: the field of view of the lidar 1 can be dynamically and automatically changed in an open-loop control/closed-loop control manner according to the application environment of the lidar 1, for example, according to the obtained characteristic information of the target object; in particular, the vertical-axis angular resolution and/or the horizontal angular resolution of the lidar 1 can be dynamically improved for a specific key area.

For this reason, the lidar 1 can be provided with different working modes, including but not limited to a normal working mode and an enhanced working mode. In the normal working mode of the lidar 1, the sub-fields of view of the plurality of laser transceiver module groups 2 at least partially overlap each other, forming a stitched field of view of the lidar 1 as a whole, so that the balanced scanning performance of the lidar 1 is achieved by using a certain number of laser transceiver module groups 2. Here, the balanced scanning performance means that the size of the field of view is coordinated and matched with the vertical-axis angular resolution and/or the horizontal angular resolution, for example, achieving the performance of the lidar 1 that meets the application requirements.

In the enhanced working mode of the lidar 1, by using the orientation adjustment device to adjust the orientation of the laser transceiver module group 2, more laser transceiver module groups 2 are allocated to s specific area or key area for scanning. For example, a greater number of laser transceiver module groups 2 than that in the normal working mode are allocated to a specific area or key area for scanning, thereby obtaining an increased stitched field of view, vertical-axis angular resolution and/or horizontal angular resolution in this area, thereby improving the overall performance of the lidar 1. That is to say, for example, in the normal working mode, 30% of the laser transceiver module groups 2 cover or at least partially cover a specific area or key area for scanning, while in the enhanced working mode, a greater number of laser transceiver module groups 2, such as 40%, 50% or even 60% or more of the laser transceiver module groups are allocated to the specific area or key area for scanning, thereby enhancing the scanning frequency and resolution of the lidar 1 in these areas. Of course, the field-of-view angle, scanning orientation or other characteristic parameters of the lidar 1 may also be changed by the enhanced working mode.

In some implementations, the lidar 1 also has an emergency working mode. When it is detected that the laser transceiver module group 2 fails or is externally damaged, it is switched to the emergency working mode of the lidar 1, and the spare laser transceiver module group 2 is put into use and replaces the faulty or externally damaged laser transceiver module group 2, ensuring that the functionality and performance of the lidar 1 are not compromised and degraded.

In some implementations, the orientation adjustment device may be controlled by the control module 6, so that the variable field of view of the lidar 1 may be dynamically achieved according to requirements. In particular, by changing the posture of the laser transceiver module groups, that is, changing the orientation and angle of the laser beam emitted by the laser 31 of the laser transmitting end 3, for example, in the case of being used as a vehicle-mounted lidar 1, the stitched field of view of the lidar 1 may be dynamically adjusted according to the external environment of the vehicle, especially real-time road conditions, and in particular, the vertical-axis angular resolution and the horizontal angular resolution within a specific angle range are improved.

The concepts of the present disclosure will be further described in detail below with reference to specific embodiments. It should be pointed out that the embodiments listed here are only used to clearly illustrate the inventive concepts of the present disclosure, and should not be construed as a limitation of the present disclosure. The technical features of the lidar 1 involved here, as long as they do not violate natural laws or technical specifications, can be arbitrarily combined or replaced within the framework of the concepts of the present disclosure, which are all within the scope of the concepts of the present disclosure.

FIGS. 6 to 9 show some embodiments of the lidar 1 according to the present disclosure, in which exactly two laser transceiver module groups 2 are provided, and a double-faceted mirror is used as the scanning component of the scanning module 4. As shown in the figure, the two laser transceiver module groups 2 are arranged symmetrically with respect to the double-faceted mirror as the scanning component of the scanning module 4, and are arranged in a triangular shape with the double-faceted mirror. That is to say, the two laser transceiver module groups 2 and the scanning module 4 are located on vertices of a triangle, respectively, and the triangle may be an equilateral triangle, in particular.

Of course, according to the application scenes and performance requirements of the lidar 1, it may also be considered that the laser transceiver module group 2 adopts a non-triangular arrangement with respect to the double-faceted mirror as the scanning component of the scanning module 4. For example, in order to deal with a special scanning angle range, or in order to change the scanning frequency/scanning angular resolution of a specific area in a targeted manner, the laser transceiver module group 2 may also be arranged in a straight line or in a plane with the rotation axis.

Figure 6:
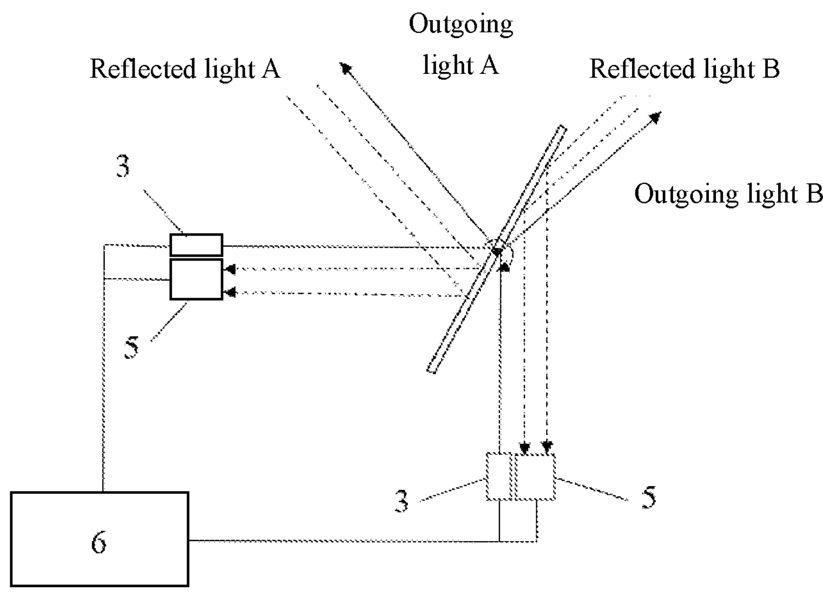
FIG. 6 is a schematic diagram of a first rotational state of a reflector in some embodiments of a lidar according to the present disclosure.
Figure 7:
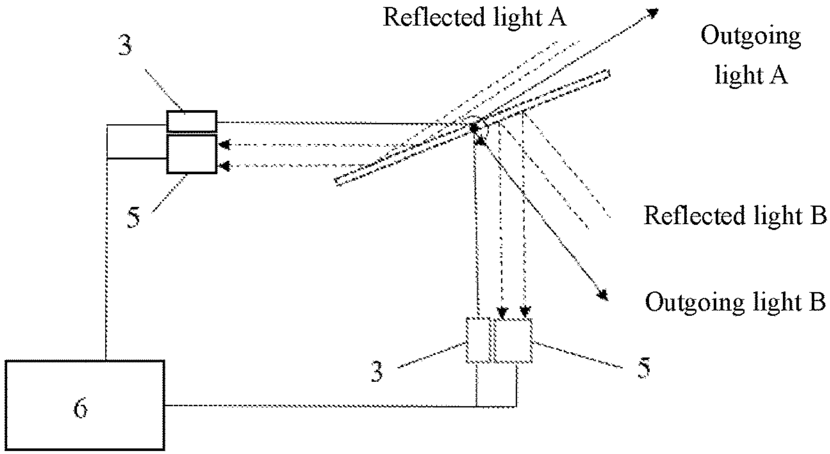
FIG. 7 is a schematic diagram of a second rotational state of the reflector in some embodiments of the lidar according to the present disclosure.

FIG. 6 shows a first rotational state of the double-faceted mirror according to some embodiments of the present disclosure, and FIG. 7 shows a second rotational state of the double-faceted mirror according to some embodiments of the present disclosure. The laser beam emitted by the laser transmitting end 3 of the laser transceiver module group 2 is projected to the target object in the form of linear laser light after passing through the laser shaping module. Two laser transceiver module groups 2 are placed on both sides of the double-faceted mirror, respectively, each being integrated with a laser transmitting end 3 and a laser receiving end 5. The target object is detected and scanned by rotating the double-faceted mirror. The laser beams reflected from the target object are also received by the double-faceted mirror of the scanning module 4 and reflected to the laser receiving ends 5 of the laser transceiver module groups 2 separately. The receiving lens groups of the laser receiving ends 5 can receive and transmit the reflected laser beams, and make the reflected laser beams converged on the detectors of the laser receiving ends 5.

Here, the two laser transceiver module groups 2 form their respective sub-fields of view, respectively, wherein different areas of the reflective surface of the double-faceted mirror constitute a transmission scanning module/area and a reception scanning module/area, respectively, that is, the reflective surface area used as the transmission scanning module is specially configured for reflecting the laser beam emitted by the laser transmitting end 3 to the target object, while the reflective surface area used as the reception scanning module is specially configured for receiving and guiding the laser beam reflected from the target object and changing its direction to the laser receiving end 5.

Figure 8:
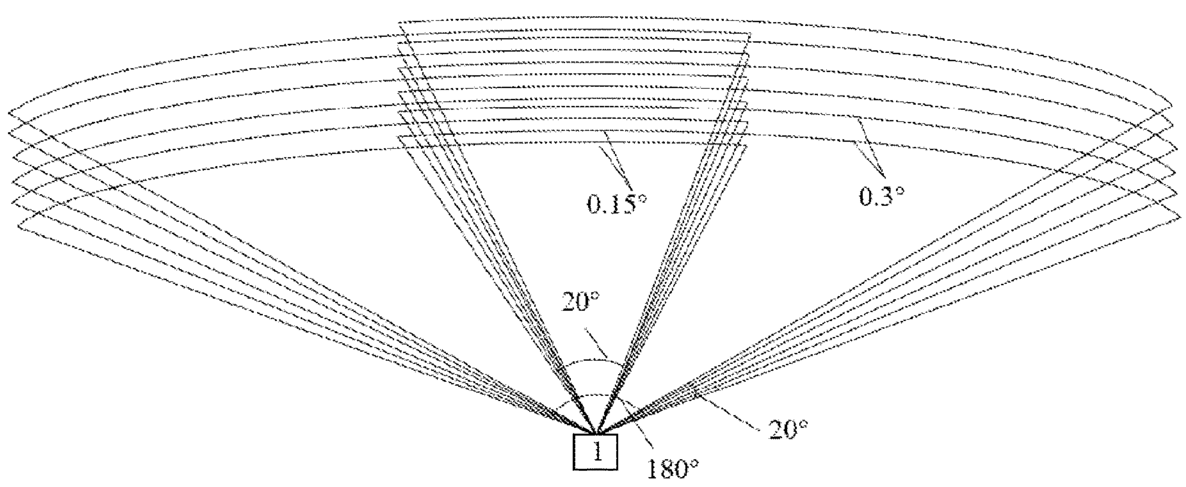
FIG. 8 is a schematic diagram of an angular resolution of an overlapping part with the field of view being stitched in some embodiments of the lidar according to the present disclosure.

FIG. 8 is a schematic diagram of the angular resolution of an overlapping part after the field of view is stitched, according to some embodiments of the present disclosure. The vertical-axis field of view is related to a divergence angle after laser shaping. For example, in this embodiment, the vertical-axis field of view is 20°. For example, in the embodiment shown in FIG. 8, the detector in the laser receiving end adopts a 64-line linear array APD. The lidar 1 has a vertical-axis angular resolution of 0.3° in the non-overlapping part, the vertical-axis angular resolution may be improved to 0.15° in the overlapping part, and the scanning resolution of the overlapping part is higher than that of the non-overlapping part. Likewise, the size of the vertical-axis angular resolution here is only used as an example for illustrating the inventive concepts, and does not constitute a limitation to the present disclosure. In fact, according to the technical solutions of the present disclosure, a detection scanning field of view of 0.1° or even higher may also be achieved according to requirements.

Figure 9:
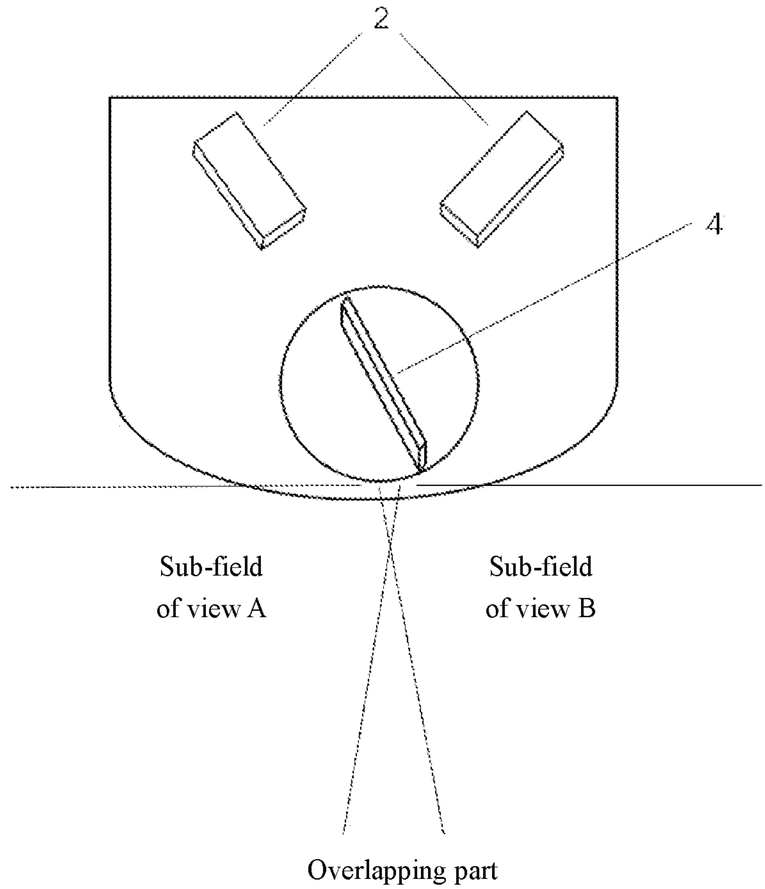
FIG. 9 is a schematic top view of a stitched scanning field of view in some embodiments of the lidar according to the present disclosure.

FIG. 9 is a schematic top view of a stitched scanning field of view in accordance with some embodiments of the present disclosure. Here, for example, an electric motor may be configured for driving the double-faceted mirror to rotate. In this regard, the control module 6 can be configured for controlling the starting, stopping and working modes of the motor, etc., especially for regulating the rotational speed of the electric motor. For example, the scanning sub-fields of view formed correspondingly by the two laser transceiver module groups 2 each have a horizontal field of view of 100°, in which there is an overlapping part of 20°, so the overall horizontal field-of-view angle is 180°.

It should be pointed out that the size of the horizontal angular resolution here is only used as an example for illustrating the inventive concepts, and does not constitute a limitation to the present disclosure. In fact, according to the technical solutions of the present disclosure, a detection scanning field of view of 200° or more may also be achieved according to requirements.

Here, an orientation adjustment device (not shown) may also be included. The plurality of laser transceiver module groups 2 can individually adjust the orientation relative to the reflective surface of the scanning module 4 through the orientation adjustment device, thereby adjusting the included angle with the reflective surface of the scanning module 4.

The control module 6 may control the orientation adjustment device to automatically adjust the orientation of the plurality of laser transceiver module groups 2 relative to the reflective surface of the scanning module 4 according to the obtained characteristic information of the target object. In other words, the orientation adjustment device can individually set different included angles of the laser transceiver module groups 2 relative to the reflective surface of the scanning module 4, thereby improving the vertical-axis and/or horizontal angular resolution of a specific field of view.

Figure 10:
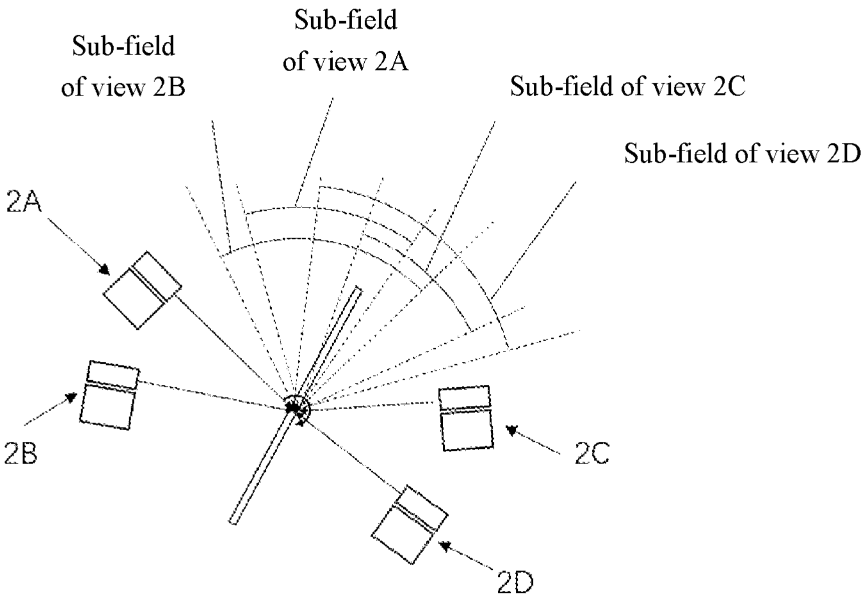
FIG. 10 is a schematic diagram of some embodiments of the lidar according to the present disclosure, which increases the laser transceiver module groups from two to four on the basis of the foregoing embodiments.

FIG. 10 shows some embodiments of the lidar 1 of the present disclosure, wherein exactly four laser transceiver module groups 2A-2D are provided, and a double-faceted mirror is used as the scanning component of the scanning module 4. As shown in the figure, the four laser transceiver module groups 2A-2D are symmetrically arranged on both sides with respect to the reflective surface of the double-faceted mirror serving as the scanning component of the scanning module 4, and generally form a rectangle. In other words, the four laser transceiver module groups 2A-2D are each disposed on one of the four corners of the rectangle, and the double-faceted mirror as the scanning component of the scanning module 4 is located at the geometric center of the rectangle. In these embodiments, the rotation axis of the double-faceted mirror serving as the scanning component of the scanning module 4 coincides with the intersection of the two diagonals of the rectangle formed by the four laser transceiver module groups 2A-2D.

Of course, according to the application scenes and performance requirements of the lidar 1, it may also be considered that the laser transceiver module groups 2 adopt a non-rectangular arrangement with respect to the reflective surface of the double-faceted mirror as the scanning component of the scanning module 4. For example, in order to enhance the scanning important area or key area, or, for example, in order to deal with a special scanning angle range, or in order to change the scanning frequency/scanning angular resolution of a specific area in a targeted manner, the laser transceiver module groups 2 may be arranged in a trapezoid or other irregular quadrilateral. In particular, different positions of the laser transceiver module groups 2 may be set according to the detection requirements.

As shown in the figure, the four laser transceiver module groups 2A-2D form respective corresponding sub-fields of view 2A-2D, respectively, and the sub-fields of view 2A-2D overlap each other. Similarly, different areas of the reflective surface of the double-faceted mirror may constitute a transmission scanning module/area and a reception scanning module/area, respectively, that is, the reflective surface area used as the transmission scanning module is specially configured for reflecting the laser beam emitted by the laser transmitting end 3 to the target object, while the reflective surface area used as the reception scanning module is specially configured for receiving and guiding the laser beam reflected from the target object and changing its direction to the laser receiving end 5.

Here, in order to drive the double-faceted mirror to rotate, an electric motor can also be provided, and the control module 6 can be configured for controlling the starting, stopping and working modes of the electric motor, especially regulating the rotational speed of the electric motor.

On the basis of the foregoing embodiments, the number of laser transceiver module groups 2 in these embodiments can be increased from two to four. Compared with the foregoing embodiments, the sub-fields of view 2A-2D formed by the four laser transceiver module groups 2A-2D partially overlap, which is more conducive to improving the scanning resolution. For example, the vertical-axis angular resolution can reach 0.075°.

For the four laser transceiver module groups, the control module 6 may coordinately control the actuators assigned to the four laser transceiver module groups according to a predetermined working mode, so that the control module 6 can adjust the orientation of the four laser transceiver module groups using the actuators by switching between different working modes, allowing the lidar to automatically match different application scenes or environmental conditions, such as changing the scanning field of view of the lidar 1, and improving the vertical-axis angular resolution and/or horizontal angular resolution of a specific scanning area or key scanning area.

Figure 11:
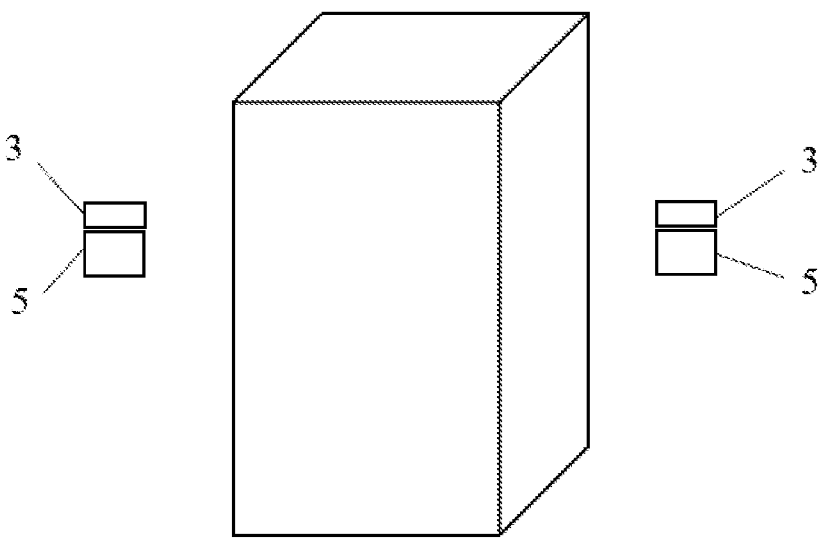
FIG. 11 is a schematic diagram of a scanning module in some embodiments of the lidar according to the present disclosure, wherein the scanning module is configured as a quadrangular prism.

FIG. 11 is a scanning module 4 according to some embodiments of the present disclosure. Here, the scanning module 4 is configured as a quadrangular prism, especially a regular quadrangular prism or a rectangular parallelepiped prism. The quadrangular prism rotates around its central axis.

Figure 12:
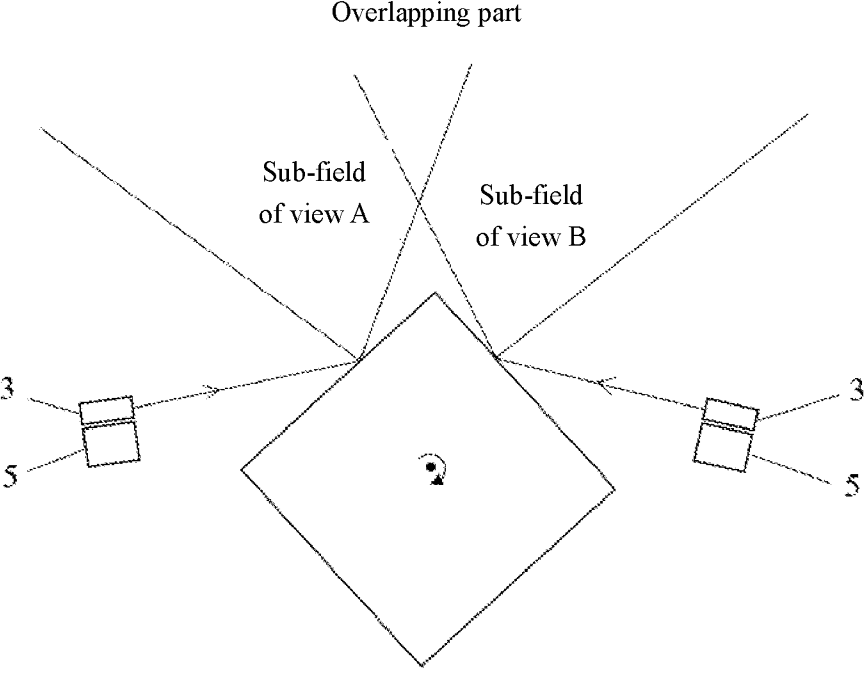
FIG. 12 is a schematic diagram of a stitched field of view in some embodiments of the lidar according to the present disclosure.

FIG. 12 is a schematic diagram of a stitched field of view according to some embodiments of the present disclosure. Here, taking exactly two laser transceiver module groups 2 as an example, a case where a stitched field of view is formed when a quadrangular prism is used as the scanning component of the scanning module 4 is shown. As shown in the figure, the two laser transceiver module groups 2 are arranged symmetrically with respect to the central axis of the quadrangular prism as the scanning component of the scanning module 4. For example, the two laser transceiver module groups 2 are arranged in the same plane as the central axis of the quadrangular prism. Of course, other irregular or dislocation arrangements may also be considered to achieve a special field-of-view stitching effect. Through the suitable arrangement of the laser transceiver module groups 2, in combination with the quadrangular prism as the rotating scanning component of the scanning module 4, the field of view of the lidar 1 can be effectively expanded, the scanning frequency can be increased, and even the target object or the specific area can be monitored in real time.

Figure 13:
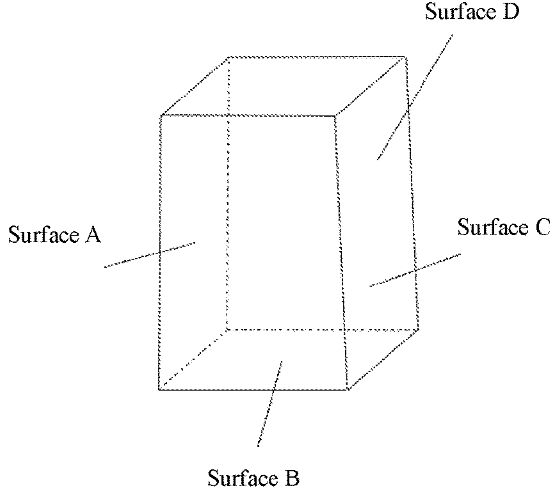
FIG. 13 is a schematic diagram of some embodiments of the lidar according to the present disclosure, which configures the scanning module as a different-faceted prism on the basis of the foregoing embodiments.

FIG. 13 shows some embodiments according to the present disclosure, which, on the basis of the previous embodiments, configure the scanning module 4 as a different-faceted prism, specifically, a different-faceted quadrangular prism in these embodiments. The characteristic of the different-faceted quadrangular prism is that the included angles of its four side surfaces and the central axis of the quadrangular prism are different from each other. For example, the included angles formed by the laser beams emitted by the lasers 31 of the laser transmitting ends 3 of the laser transceiver module groups 2 and respective reflective surfaces of the different-faceted prism are different from each other, so the scanning sub-fields of view formed by the laser transceiver module groups 2 partially overlap each other, forming the stitched field of view of the lidar 1.

Figure 14:
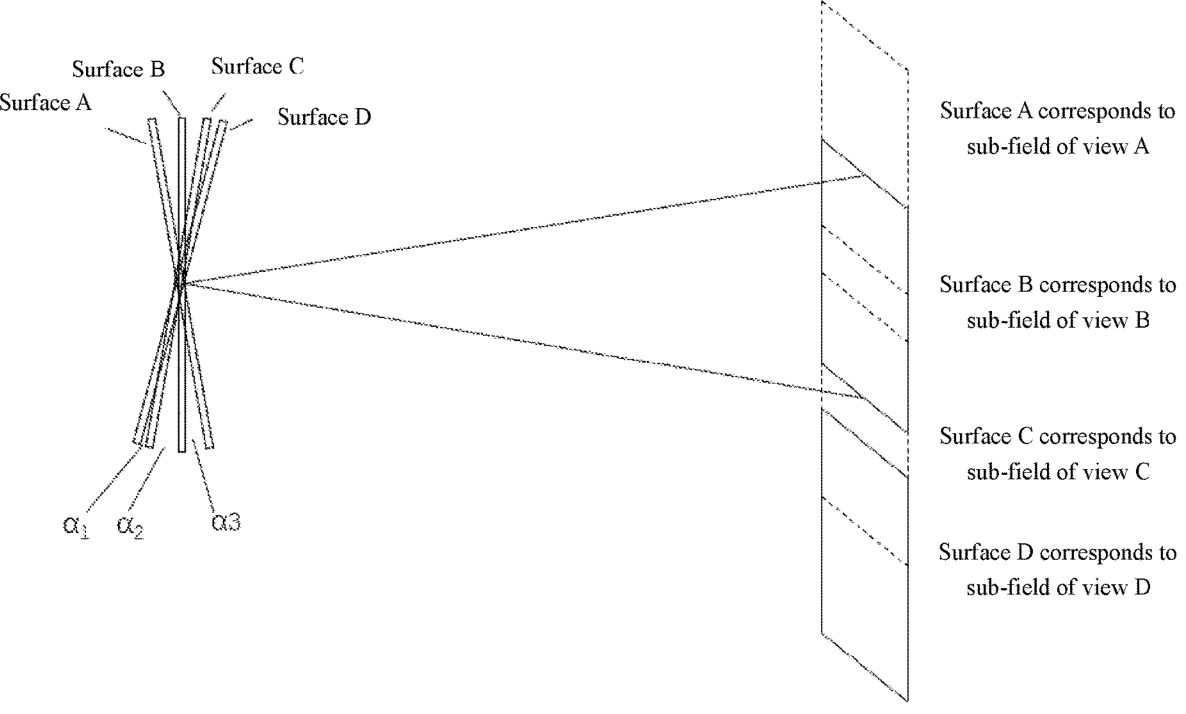
FIG. 14 is a schematic diagram of a detection field of view when scanning with a laser transceiver module group in some embodiments according to the present disclosure.

FIG. 14 is a schematic diagram of a detection field of view in the case of scanning using a group of transceiver modules in some embodiments according to the present disclosure, wherein the overlapping positional relationship between the sub-fields of view A-D corresponding to the respective reflective surfaces of the different-faceted prism can be seen. In FIG. 14, the four reflective side surfaces of the different-faceted quadrangular prism are imaginatively placed on an axis (represented as an intersection in plan view), thereby more clearly showing the positional relationship of angles α1, α2 and α3 between the four reflective side surfaces.

That is to say, since the included angles formed by the laser beams emitted by the lasers 31 of the laser transmitting ends 3 of the laser transceiver module groups 2 and the respective reflective surfaces of the different-faceted prism are different from each other, the sub-fields of view formed correspondingly by the respective reflective surfaces of the different-faceted prism are also in different orientations. For example, as shown in FIG. 14, sub-field of view A corresponding to surface A of the different-faceted prism is represented as a first rectangle (dashed line) from top to bottom in FIG. 14, sub-field of view B corresponding to surface B is represented as a second rectangle (solid line) from top to bottom shown in FIG. 14, sub-field of view C corresponding to surface C is represented as a third rectangle (dashed line) from top to bottom in FIG. 14, and sub-field of view D corresponding to surface D is represented as a fourth rectangle (solid line) from top to bottom in FIG. 14. Here, there is a partial field of view overlapping in a specific manner between every two adjacent sub-fields of view, thereby forming a stitched field of view of the lidar 1 as a whole.

It should be pointed out that by appropriately matching the included angles formed by the laser beams emitted by the lasers 31 of the laser transmitting ends 3 of the laser transceiver module groups 2 and the reflective surfaces of the scanning module 4, especially by adjusting the orientations of the laser transceiver module groups 2 or changing the reflective surface angle or component structure of the scanning component of the scanning module 4, a specific stitched field of view in a vertical direction and/or a specific stitched field of view in a horizontal direction of the lidar 1 can be achieved.

FIG. 14 is a schematic diagram of a stitched detection field of view formed by scanning with only one laser transceiver module group 2. In practical applications, at least two laser transceiver module groups 2 may be used. By adopting an appropriate arrangement as described previously, a more complex and special field-of-view stitching effect can be achieved to meet the diverse and changing requirements of practical applications. Here, the different-faceted prism has, by way of example, four reflective side surfaces. Of course, other multifaceted prisms may also be considered, and the include angles between the different reflective surfaces of the different-faceted prism or the included angle with the central axis are set according to the actual application requirements and the concepts of the present disclosure, so as to achieve a favorable scanning field of view with a large range or even being panoramic. For example, real-time monitoring or a greater vertical-axis angular resolution and/or horizontal resolution is achieved.

In some embodiments according to the present disclosure, the lidar 1 mainly includes a laser transmitting end 3, a laser receiving end 5 and a scanning module 4. The laser transmitting end 3 has a laser, and the laser is configured for emitting a laser beam for detecting a target object. The laser receiving end 5 has a detector, and the detector is configured for receiving the laser beam guided by the scanning module 4 and reflected from the target object. The scanning module 4 is configured for guiding the laser beam emitted by the laser to scan the target object, and/or receiving and guiding the laser beam reflected from the target object.

In some embodiments according to the present disclosure, the lidar is further equipped with a control module 6, which is configured for controlling transmission and reception of laser light, and obtaining characteristic information of the target object through post-signal data processing. A scanning component of the scanning module 4 is configured as a rotatable plate-shaped double-faceted mirror 41.

In some embodiments, according to actual application requirements, the control module 6 may be configured as an independent electronic device relative to the lidar 1, and is separated from the lidar body in structure and arrangement position, thereby achieving independent design, manufacture and installation of the control module 6, or achieving remote control and data analysis of the lidar 1, for example. In other embodiments, the control module 6 may also optionally be configured as an integral part of the lidar 1, for example, arranged in a lidar housing or integrated with an optoelectronic device of the lidar 1, so that during production and installation of the lidar, a complete lidar system can be obtained, for example.

By using the rotatable plate-shaped double-faceted mirror 41 as the scanning component, it not only facilitates keeping the weight of the scanning component light, but also can significantly increase the light output aperture and the receiving beam aperture, so as to easily realize high-speed scanning, especially in a wide range in the horizontal direction. In addition, the technical solution according to the present disclosure can easily and efficiently utilize the linear scanning laser light, which helps to significantly improve the vertical angular resolution of the lidar 1 without increasing the number of lasers.

Figure 15:
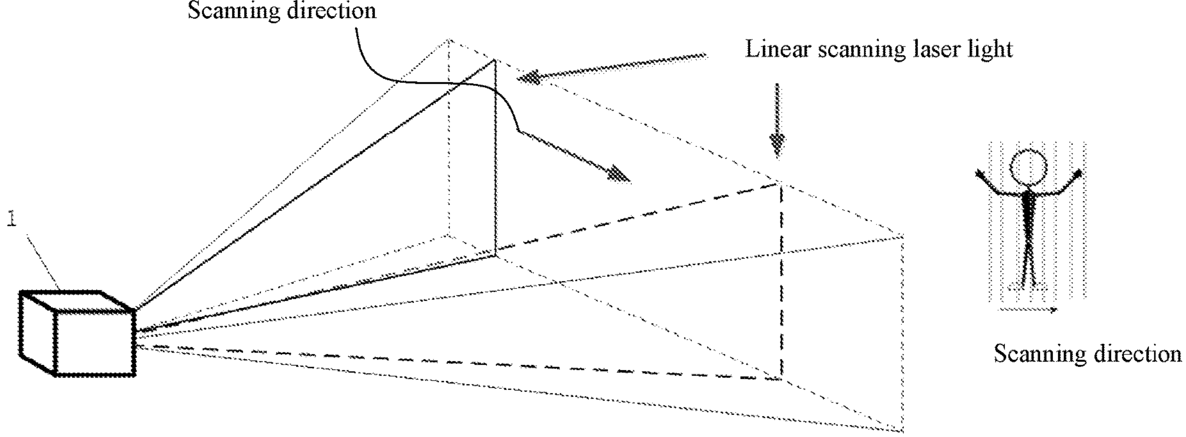
FIG. 15 is a scanning schematic diagram of a lidar according to some embodiments of the present disclosure.

FIG. 15 is a scanning schematic diagram of a lidar 1 according to some embodiments of the present disclosure. A laser shaping module of the lidar 1 shapes the laser beam emitted by the laser of the laser transmitting end 3 into linear scanning laser light, so the laser beam is incident onto the reflective surface of the plate-shaped double-faceted mirror 41 as the scanning component of the scanning module 4 in the form of linear scanning laser light. In FIG. 15, after the linear scanning laser light is reflected by the reflective surface, it still scans a human body representing the target object in the form of the linear scanning laser light.

As shown in FIG. 15, the laser beam is shaped into linear scanning laser light, i.e., a linear light spot, by the shaping module of the laser transmitting end 3 of the lidar 1, and then the rotatable plate-shaped double-faceted mirror 41 is used as the scanning component. The use of a one-dimensional scanning module 4 can realize three-dimensional scanning, which thus significantly reduces the requirements for scanning component, reduces the cost of the whole machine, and can efficiently reflect the linear scanning laser light and scan the target object with the linear scanning laser light.

Figure 16:
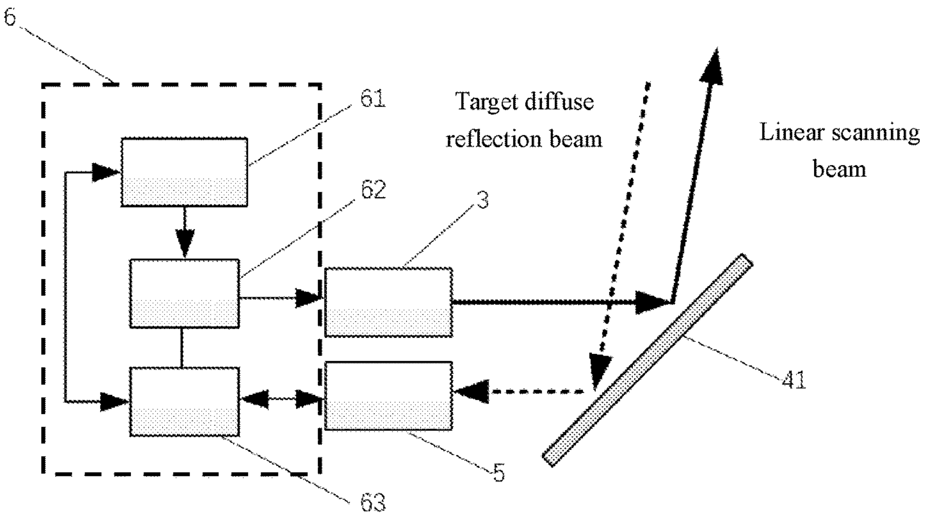
FIG. 16 is a principle block diagram of a lidar according to some embodiments of the present disclosure.

FIG. 16 is a principle block diagram of a lidar 1 according to some embodiments of the present disclosure.

According to some embodiments of the present disclosure, the laser transmitting end 3 of the lidar 1 includes a laser and a laser shaping module, wherein the laser is configured for emitting a laser beam for detecting a target object. The laser may be selected from solid-state lasers or semiconductor laser types, such as fiber lasers. However, the technical solutions proposed by the present disclosure include but are not limited to the aforementioned laser types, but any device capable of generating and emitting laser light may be used, and it is not limited in the present disclosure.

In addition, the laser transmitting end 3 also has a transmitting lens group, which is configured as a laser shaping module. The laser shaping module transmits the laser beam emitted by the laser, and the functions of collimation, homogenization and shaping of the laser beam are achieved. According to different design functions and purposes, one or more of the three functions of collimation, homogenization, and shaping may be used to finally form, for example, point-shaped or linear light spots.

The laser receiving end 5 has a detector, and the detector is configured for receiving the laser beam guided by the scanning module 4 and reflected from the target object. For example, as shown in FIG. 16, the laser beam is emitted by the laser transmitting end 3 of the lidar 1, and after being reflected by the reflective surface of the plate-shaped double-faceted mirror 41, the laser beam is projected to the target object and scans it. After that, the laser beam reflected from the target object is first incident onto the reflective surface of the plate-shaped double-faceted mirror 41, and is received and detected by the laser receiving end 5 of the lidar 1 after being reflected.

Here, a laser signal can be detected using a photoelectric type detector or a photothermal type detector, including, for example, an avalanche photodiode, a single photon detector, or a photomultiplier tube. However, in the technical solutions according to the present disclosure, the detector includes but is not limited to the aforementioned types. Any detector capable of converting a laser signal into an electrical signal can be used in the technical solutions proposed by the present disclosure, and it is not limited in the present disclosure.

According to some embodiments of the present disclosure, the laser receiving end 5 further has a receiving lens group. For example, the receiving lens group is disposed upstream of the detector along the propagation direction of the laser beam, so that the receiving lens group can receive and transmit the laser beam reflected from the target object and/or the laser beam reflected from the scanning module 4, and converge the reflected laser beam onto the detector of the laser receiving end 5. When the linear scanning beam is irradiated onto a detection target object, the target object generates a diffuse reflection beam, and the diffuse reflection beam is received by the laser receiving end 5 after passing through a rotatable double-faceted mirror 41. The diffusely reflected light beam is collected by the receiving lens group of the laser receiving end 5 and then converged on the detector to form a detection signal.

Here, on the one hand, the plate-shaped double-faceted mirror 41 is configured for guiding the laser beam emitted by the laser transmitting end 3 and changing the propagation direction and manner of the laser beam to scan the target object; on the other hand, the plate-shaped double-faceted mirror 41 is configured for changing the propagation direction and manner of the light beam reflected from the target object and guiding it to the receiving lens group of the laser receiving end 5 of the lidar 1.

According to some embodiments of the present disclosure, the control module 6 is configured for controlling transmission and reception of laser light, and obtaining characteristic information of the target object through post-signal data processing. The control module 6 may be configured as an independent electronic device relative to the lidar 1, and is separated from the lidar body in structure and arrangement position. Alternatively, the control module 6 may also optionally be configured as an integral part of the lidar 1. Here, the control module 6 includes, for example, a laser driving module 62, a signal processing module 63 and a main control module 61. The laser driving module 62 is used to control the laser of the laser transmitting end 3 to emit laser light. The signal processing module 63 is used to process the detection signal received by the detector of the laser receiving end 5. The main control module 61 is used to control the laser driving module 62 and the signal processing module 63, and use the signal processing module 63 to calculate the characteristic information of the target object, such as the distance and position of the target object, etc. Optionally, the main control module 61 may also control and adjust the laser driving module 62 and/or the scanning module 4 according to the characteristic information fed back by the signal processing module 63, so that the working state or working mode of the laser driving module 62 and/or the scanning module 4 can be automatically adjusted in a closed-loop control manner, for example, to dynamically and automatically adjust the performance of the lidar, such as field of view, scanning resolution, etc.

Specifically, the control module 6 may control the laser, so as to control the timing and manner of the laser emitting the laser beam, etc. For example, the laser beam may be emitted from the laser in a continuous manner or in a pulsed manner. It should be pointed out that the characteristic information of the target object includes but is not limited to characteristic parameters such as speed, position, and shape, and further includes other parameters that can be derived or calculated therefrom. The control module 6 may also control the scanning component of the scanning module 4, so as to control parameters such as the rotational speed of the rotating scanning component, for example. Of course, the control module 6 may also control the detector of the laser receiving end 5.

Figure 17:
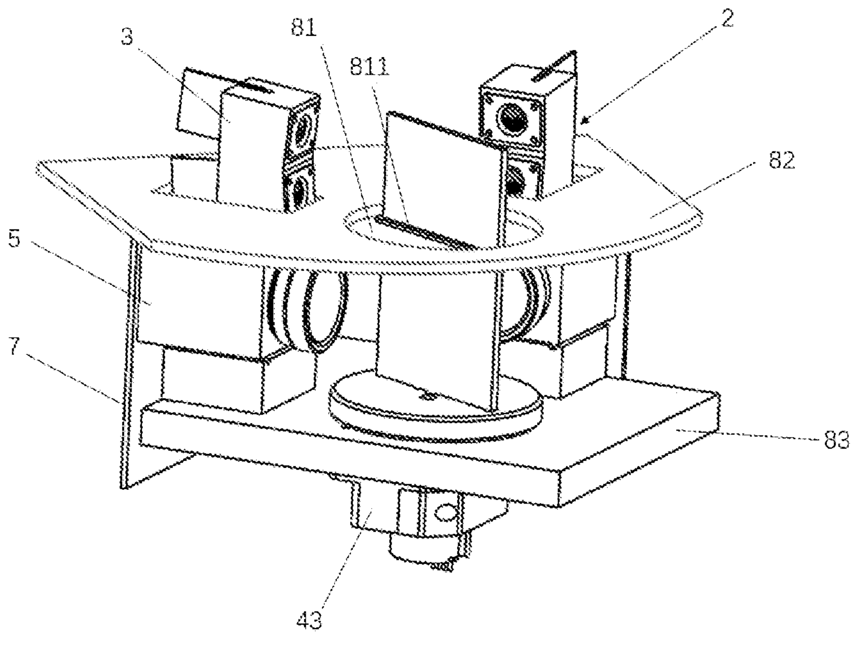
FIG. 17 is a schematic structural perspective view of a lidar according to some embodiments of the present disclosure.

FIG. 17 is a schematic structural perspective view of a lidar 1 according to some embodiments of the present disclosure. Here, reference numeral 7 is used to denote a housing 7 of the lidar 1, which defines an interior space of the lidar 1. The constituent components of the lidar 1, including but not limited to the laser transmitting end 3, the laser receiving end 5, the scanning module 4, the optional control module 6 and other optical and electronic element and components, are arranged in the interior space defined by the housing 7 of the lidar 1. The specific structure of the housing 7 can be designed and changed according to the installation and use environment of the lidar 1, and it is not limited in the present disclosure.

According to some embodiments of the present disclosure, at least one laser transmitting end 3 and at least one laser receiving end 5 are integrated into one laser transceiver module group 2. Each laser transceiver module group 2 is configured as a separate structural unit. For example, in each laser transceiver module group 2, the laser transmitting end 3 and the laser receiving end 5 integrated in the laser transceiver module group 2 are arranged in a common structural unit housing in close proximity and side by side. That is to say, a separate structural unit can be formed by integrating at least one laser transmitting end 3 and at least one laser receiving end 5 into a common laser transceiver module group housing. In FIG. 17, one laser transmitting end 3 and one laser receiving end 5 are integrated into one laser transceiver module group 2 configured as a separate structural unit. Two laser transceiver module groups 2 are provided in total in the housing 7 of the lidar 1.

In addition, the number of lasers and the number of shaping modules are not limited in the laser transmitting end 3, and may be one or more. Likewise, the number of detectors and the number of receiving lens groups are not limited in the laser receiving end 5, and may be one or more. The number of corresponding constituent components can be increased or decreased according to requirements and reasonable arrangements, and the concept of the present disclosure is not limited to the number and manner of the constituent components described as examples.

In some embodiments of the present disclosure, each laser transceiver module group 2 may be integrated with different numbers of laser transmitting ends 3 and laser receiving ends 5. For example, in one laser transceiver module group 2, a plurality of laser transmitting ends 3 correspond to one laser receiving end 5; or one laser transmitting end 3 corresponds to a plurality of laser receiving ends 5; or one laser transmitting end 3 corresponds to one laser receiving end 5; or a plurality of laser transmitting ends 3 correspond to a plurality of laser receiving ends 5. By appropriately setting and matching the relationship between the number of laser transmitting ends 3 and the number of laser receiving ends 5, and reasonably setting the number of the laser transceiver module groups 2, it facilities the flexible adjustment (especially increase) of the field of view and scanning resolution of the lidar 1.

It may also be considered that the separate laser transmitting end 3 and the separate laser receiving end 5 are connected side by side to each other to form a separate structural unit by means of mechanical connection. It may further be considered that the laser transmitting end 3 and the laser receiving end 5 are directly configured in a common structural module, thereby forming a separate structural unit.

It should be pointed out here that the laser transmitting end 3 and the laser receiving end 5 may be in an up-down positional relationship, or a left-right positional relationship, or other positional relationship relative to each other, all of which are within the scope of the concepts of the present disclosure. It is important here that the laser transmitting end 3 and the laser receiving end 5 integrated as the structural unit or the laser transceiver module group 2 can emit and receive the laser beam normally, respectively, without causing optical path interference between the laser transmitting end 3 and the laser receiving end 5 of one laser transceiver module group 2 or between the laser transmitting ends 3 and the laser receiving ends 5 of different laser transceiver module groups 2.

In some embodiments of the present disclosure, the lidar 1 includes a plurality of laser transceiver module groups 2, and the plurality of laser transceiver module groups 2 are distributed and arranged relative to the plate-shaped double-faceted mirror 41. According to the specific structural and functional requirements of the lidar 1, a specific number of laser transceiver module groups 2 may be selected. For example, the lidar 1 includes an even number of laser transceiver module groups 2, such as 2, 4, 6, 8, 10, 12 or even more laser transceiver module groups 2, and these laser transceiver module groups 2 may be generally symmetrically or asymmetrically distributed on both sides as separate structural units relative to the scanning module 4.

It may also be considered that the lidar 1 includes more than one odd number of laser transceiver module groups 2, such as 3, 5, 7, 9, 11 or even more laser transceiver module groups 2. These laser transceiver module groups 2 may be symmetrically or asymmetrically distributed on both sides as separate structural units relative to the scanning module 4. Factors that determine the arrangement of the laser transceiver module groups 2 include, but are not limited to: strengthening an important area or key area for scanning, dealing with a special scanning angle range and changing the scanning frequency/scanning angular resolution of a specific area in a targeted manner.

As shown in FIG. 17, a rotatable plate-shaped double-faceted mirror 41 is used as a scanning component of the scanning module 4 here. The plate-shaped double-faceted mirror 41 is fixed on a base 42. Here, the plate-shaped double-faceted mirror 41 is fixed upright on the base 42 with its rectangular short sides, and a rotational motion can thus be transmitted to the plate-shaped double-faceted mirror 41 with the base 42. The base 42 can be driven by the electric motor 43 to rotate about a rotation axis. Thus, the linear scanning laser light is reflected by the reflective surface of the rotating double-faceted mirror 41 to form a two-dimensional scan, especially in the horizontal scanning direction as shown in FIG. 15. In this regard, the control module 6 may also be configured for controlling the starting, stopping and working modes of the electric motor 43, etc., especially for regulating the rotational speed of the motor 43, thereby adjusting the rotational movement of the plate-shaped double-faceted mirror 41.

The lidar 1 further comprises an isolation mechanism, and the isolation mechanism separates a reflective surface of the plate-shaped double-faceted mirror 41 into a transmission scanning area and a reception scanning area. Meanwhile, the isolation mechanism also isolates the laser transmitting end 3 and the laser receiving end 5 of the laser transceiver module group 2 configured as the separate structural unit from each other. The isolation mechanism is made of a material capable of eliminating, filtering or blocking stray light. The stray light is generated by, for example, the internal and external environment of the lidar, the structure of the lidar itself, optical components arranged in the lidar, or optical components related to the lidar, and the like. For example, the stray light may be generated by the scanning component of the scanning module of the lidar itself and/or by the shaping module of the laser transmitting end and/or by the laser of the laser transmitting end, etc. Thus, for example, the adverse effects of stray light that may be generated when the plate-shaped double-faceted mirror 41 reflects the laser beam on the operation of the lidar 1 can be at least partially or even completely eliminated by the isolation mechanism.

In FIG. 17, the isolation mechanism is composed of a circular rotating partition 81 and a fixed partition 82 having a circular hole. The fixed partition 82 is, for example, fixed on the housing 7 of the lidar 1, so that in addition to isolation, it can also support the internal structure of the entire lidar 1, or be used to carry optoelectronic components or other electronic devices. In addition, the fixed partition 82 fixed on the housing 7 of the lidar 1 also extends across the laser transceiver module group 2 arranged in the interior space of the housing 7 of the lidar 1 and configured as a separate structural unit, and isolates the laser transmitting end 3 and the laser receiving end 5 of the laser transceiver module group 2 from each other.

A circular hole is constructed in the fixed partition 82, the rotating partition 81 is in a circular shape, and its circular diameter matches the diameter of the circular hole provided in the fixed partition 82. Therefore, it can be embedded into the circular hole of the fixed partition 82 when assembling the lidar, and can be rotated in the circular hole of the fixed partition 82 when the lidar is operating.

In order to enable the circular-shaped rotating partition 81 to rotate smoothly in the circular hole of the fixed partition 82, and at the same time to block the stray light generated by the internal and external environment of the lidar, the structure of the lidar itself, the optical components arranged in the lidar, or the optical components related to the lidar, and the like, which may adversely affect the operation of the lidar 1, a sliding and sealing coating may be provided between the outer circumference of the rotating partition 81 and the circular hole of the fixed partition 82. On the one hand, it can improve the sliding performance between the rotating partition 81 and the fixed partition 82, and on the other hand, it can maintain the seamless cooperation between the rotating partition 81 and the fixed partition 82, so as to completely block the stray light that would adversely affect the operation of the lidar 1. The coating here may be a structurally modified layer on the surface of the material, or may also be an attached layer of lubricating/sealing material.

The fixed partition 82 and the rotating partition 81 embedded in the circular hole of the fixed partition 82 form a partition plane, which divides the interior space of the housing 7 of the lidar 1 into two chambers, and wherein the transmission scanning area of the plate-shaped double-faceted mirror 41 and the laser transmitting end 3 of the laser transceiver module group 2 are disposed in one of the chambers, and the reception scanning area of the plate-shaped double-faceted mirror 41 and the laser receiving end 5 of the laser transceiver module group 2 are disposed in the other chamber.

In the embodiment shown in FIG. 17, the rotating partition 81 has an opening 811, and the plate-shaped double-faceted mirror 41 extends through the opening 811 of the rotating partition 81 and is fixed with the rotating partition 81. Here, the opening 811 of the rotating partition 81 has a long and narrow rectangular shape, so as to match the rectangular cross-sectional shape of the plate-shaped double-faceted mirror 41. In some embodiments, the size of the opening 811 of the rotating partition 81 and the rectangular cross-sectional size of the plate-shaped double-faceted mirror 41, on the one hand, can form a close fit so as to prevent stray light from passing through the opening 811 of the rotating partition 81 to propagate; and on the other hand, can form a force transmission fit, so that the plate-shaped double-faceted mirror 41 can drive the rotating partition 81 to rotate together when the lidar is operating. Here, the transmission scanning area and the reception scanning area of the plate-shaped double-faceted mirror 41 are respectively formed on one side of the rotating partition 81.

Instead of providing the opening 811 in the rotating partition 81, other structural forms may also be used to fix the plate-shaped double-faceted mirror 41 and the rotating partition 81. For example, the rotating partition 81 is composed of two semicircular plates, which are connected on both sides of the plate-shaped double-faceted mirror 41, for example by bonding, welding or integral forming, and are spliced together to form a complete circle.

In FIG. 17, the partition plane formed by the fixed partition 82 and the rotating partition 81 divides the interior space of the housing 7 of the lidar 1 into an upper chamber and a lower chamber, wherein the upper chamber is arranged with assemblies related to transmission of laser light, including but not limited to the laser transmitting ends 3 of the laser transceiver module groups 2 and the transmission scanning area of the plate-shaped double-faceted mirror 41, and the lower chamber are arranged with assemblies related to reception of laser light, including but not limited to the laser receiving ends 5 of the laser transceiver module groups 2 and the reception scanning area of the plate-shaped double-faceted mirror 41.

According to the present disclosure, through the isolation mechanism composed of the circular rotating partition 81 and the fixed partition 82 with the circular hole, the emitted linear scanning beam and the reflected beam of the target object are reflected in different areas of the rotatable plate-shaped double-faceted mirror 41, so as to effectively isolate the transmission and reception light paths and avoid the risk of stray light.

It should be pointed out that the positional relationship between the laser transmitting end 3 and the laser receiving end 5 of each laser transceiver module group 2 in the separate structural unit can be set as needed. For example, they may be placed up and down or left and right. Meanwhile, the laser transmitting end 3 and the laser receiving end 5 may be located in different chambers in the interior space of the housing 7 of the lidar 1 without being affected by the mutual positional relationship between the laser transmitting end 3 and the laser receiving end 5. That is to say, the partition plane formed by the fixed partition 82 and the rotating partition 81 may also divide the interior space of the housing 7 of the lidar 1 into two chambers, left and right, or two chambers in any other possible positional relationship.

Likewise, the interior space of the housing 7 of the lidar 1 can be divided into more functional chambers by using an isolation mechanism. For example, the structural unit casing of the laser transceiver module group 2 and the casing 7 of the lidar 1 can be integrally formed, so as to form a separate chamber for laser transceiver module group. In this case, the relative positional relationship between the laser transceiver module group 2 and the scanning component of the scanning module 4 can be accurately determined in advance, which simplifies the optical calibration steps that must be performed in the process of assembling the lidar 1, and makes the lidar 1 itself easy to implement modular structure.

It should be pointed out that no matter what structural form the rotating partition 81 itself adopts, or how the interior space of the housing 7 of the lidar 1 is divided, the partition plane formed by the fixed partition 82 and the rotating partition 81 and the reflective surface of the plate-shaped double-faceted mirrors 41 forms an angle, and are in particular perpendicular to each other. In the case of being perpendicular, it is easy for the lidar 1 to realize that the rotation axis of the plate-shaped double-faceted mirror 41 coincides with the rotation axis of the output shaft of the driving motor 43 in structure, which not only facilitates simplified structural design of the lidar 1, but also facilitates efficient scanning in the horizontal direction using linear scanning laser light.

Of course, it may also be considered that the partition plane formed by the fixed partition 82 and the rotating partition 81 forms other angles, such as 30° or 60°, with the reflective surface of the plate-shaped double-faceted mirror 41. This means that the laser beams emitted by the laser transmitting ends 3 of each laser transceiver module groups 2 may form different angles with the reflective surface of the plate-shaped double-faceted mirror 41, so that the special field-of-view angle, scanning range, or other scanning characteristics of the lidar 1 can be achieved according to requirements.

The isolation mechanism may also include a bottom plate 83, and the bottom plate 83 additionally divides the interior space of the housing 7 of the lidar 1 to obtain a separate equipment chamber. In FIG. 17, the bottom plate 83 separates the housing 7 of the lidar 1 to obtain a separate equipment chamber below the partition plane formed by the fixed partition 82 and the rotating partition 81, and an electric motor 43 for driving the base 42 to rotate may be provided in this separate equipment chamber. Of course, other electromechanical assemblies, such as the control module 6 itself or electronic devices associated therewith, etc., may also be accommodated in this equipment chamber.

In some embodiments of the present disclosure, the interior space of the housing 7 of the lidar 1 is formed with a three-chamber structure as a whole by an isolation mechanism including a fixed partition 82, a rotating partition 81 and a bottom plate 83. Thus, through simple and effective measures, functional optimization and structural partitioning at the optical, electrical and mechanical levels are achieved, which not only avoids unfavorable stray light optically, but also shields harmful electromagnetic interference, and can mechanically achieve modular manufacturing and assembly.

The laser shaping module can shape the laser beam emitted by the laser of the laser transmitting end 3 into linear scanning laser light, and the plate-shaped double-faceted mirror 41 reflects the linear scanning laser light and scans the target object. Specifically, the laser transmitting end 3 emits a ray of light, which can be regarded as a number of continuous points in the vertical direction, and the target area/object is scanned by rotating the plate-shaped double-faceted mirror 41. Meanwhile, by shaping the laser beam into linear scanning laser light, in combination with other improvement measures for the lidar 1 proposed in the present disclosure, an improved field of view of the lidar 1 can be obtained, which significantly improves the working flexibility, reliability and work performance of the lidar 1.

Figure 18:
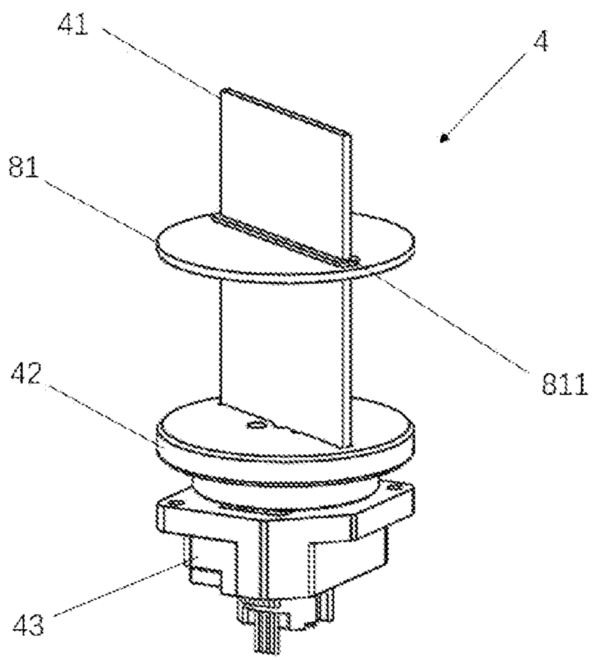
FIG. 18 is a schematic structural perspective view of a scanning module of a lidar according to some embodiments of the present disclosure.

FIG. 18 is a schematic structural perspective view of a scanning module 4 of a lidar 1 according to some embodiments of the present disclosure. As shown in the figure, the plate-shaped double-faceted mirror 41 is mounted on, for example, a circular base 42 in an upright manner. The base 42 can be driven by an electric motor 43 below to rotate about a vertical rotation axis, and thus drives the plate-shaped double-faceted mirror 41 to rotate together. Here, on the one hand, the reflective surface of the plate-shaped double-faceted mirror 41 is perpendicular to the rotation plane of the base 42, and on the other hand, the rotation axes of the two coincide with each other.

The base 42 can be directly arranged on the housing 7 of the lidar 1 by using structures such as bearings, or as shown in FIG. 7, the base 42 may also be arranged on the bottom plate 83, and the bottom plate 83 divides the interior space of the housing 7 of the lidar 1 to obtain a separate equipment chamber. In the case that there is a separate equipment chamber, the electric motor 43 for driving the base 42 to rotate, or other driving/transmission mechanisms, may be conveniently arranged in the equipment chamber. An output shaft of the electric motor 43 may be connected to the base 42 carrying the plate-shaped double-faceted mirror 41 through the bottom plate 83. This design scheme not only achieves the partitioning of optical and mechanical functions, but also facilitates shielding the electromagnetic radiation generated by the electric motor 43 during operation, further improving the working stability and reliability of the lidar 1.

In the embodiment shown in FIG. 18, the plate-shaped double-faceted mirror 41 passes through an elongated rectangular opening 811 of a circular rotating partition 81 and is fixed to the rotating partition 81 without any gap. Here, the opening 811 of the rotating partition 81 may be press-fitted with the plate-shaped double-faceted mirror 41 to prevent stray light from propagating through the gap between the rotating partition 81 and the plate-shaped double-faceted mirror 41. Alternatively, other sealing and fixing measures may also be considered. For example, other gap fillers and/or adhesives are filled between the opening 811 of the rotating partition 81 and the plate-shaped double-faceted mirror 41. Thus, on the one hand, it avoids a gap between the opening 811 of the rotating partition 81 and the plate-shaped double-faceted mirror 41 that may allow stray light to propagate; and on the other hand, it ensures a firm force transmission connection formed between the rotating partition 81 and the plate-shaped double-faceted mirror 41, so that the plate-shaped double-faceted mirror 41 can also drive the rotating partition 81 to rotate together.

As shown in FIG. 18, the rotating partition 81 and the bottom plate 83 are parallel to each other, and both are perpendicular to the reflective surface of the plate-shaped double-faceted mirror 41. Here, the rotation axis of the output shaft of the electric motor 43 for driving the base 42 to rotate passes through the center of the circular base 42 and the rotating partition 81, and coincides with the rotation axis of the plate-shaped double-faceted mirror 41.

The scanning module 4 according to the present disclosure, including but not limited to the plate-shaped double-faceted mirror 41, the rotating partition 81, the base 42 and the motor 43, may be configured as a separate pre-assembled module, thereby greatly simplifying the manufacturing and assembly processes of the lidar 1, and it can be easily replaced and repaired when needed.

In some embodiments of a manufacturing method for the lidar 1 according to the present disclosure, the scanning component of the scanning module 4 is configured as a rotatable plate-shaped double-faceted mirror 41. In addition, an isolation mechanism is provided to separate the reflective surface of the plate-shaped double-faceted mirror 41 into a transmission scanning area and a reception scanning area while isolating the laser transmitting end 3 and the laser receiving end 5 of the laser transceiver module group 2 configured as the separate structural unit. The isolation mechanism is composed of a circular rotating partition 81 and a fixed partition 82 with a round hole, wherein the fixed partition 82 is fixed on the housing 7 of the lidar 1, the rotating partition 81 is embedded into the circular hole of the fixed partition 82 during assembly, and the rotating partition 81 can be rotated in the circular hole of the fixed partition 82. The plate-shaped double-faceted mirror 41 can drive the rotating partition 81 to rotate together.

In other embodiments according to the present disclosure, the scanning component of the scanning module 4 may also be configured as a rotatable prism.

Similar to the previous embodiment, the lidar 1 mainly includes a laser transmitting end 3, a laser receiving end 5 and a scanning module 4. The laser transmitting end 3 has a laser, and the laser is configured for emitting a laser beam for detecting a target object. The laser receiving end 5 has a detector, and the detector is configured for receiving the laser beam guided by the scanning module 4 and reflected from the target object. The scanning module 4 is configured for guiding the laser beam emitted by the laser to scan the target object, and/or receiving and guiding the laser beam reflected from the target object.

In some embodiments according to the present disclosure, the lidar is further equipped with a control module 6, which is configured for controlling transmission and reception of laser light, and obtaining characteristic information of the target object through post-signal data processing. The scanning component of the scanning module 4 is configured as a rotatable prism 44.

In some embodiments, according to actual application requirements, the control module 6 may be configured as an independent electronic device relative to the lidar 1, and is separated from the lidar body in structure and arrangement position, thereby achieving independent design, manufacture and installation of the control module 6, or achieving remote control and data analysis of the lidar 1, for example. In other embodiments, the control module 6 may also optionally be configured as an integral part of the lidar 1, for example, arranged in a lidar housing or integrated with an optoelectronic device of the lidar 1, so that during production and installation of the lidar, a complete lidar system can be obtained, for example.

By using the rotatable prism 44 as the scanning component, it not only facilitates keeping the weight of the scanning component light, but also can significantly increase the light output aperture and the receiving beam aperture, so as to easily realize high-speed scanning, especially in a wide range in the horizontal direction. In addition, the technical solution according to the present disclosure can easily and efficiently utilize the linear scanning laser light, which helps to significantly improve the vertical angular resolution of the lidar 1 without increasing the number of lasers. Referring also to FIGS. 15 and 16 below, a lidar including a rotatable prism 44 will be described.

FIG. 15 is a scanning schematic diagram of the lidar 1 according to some embodiments of the present disclosure. A laser shaping module of the lidar 1 shapes the laser beam emitted by the laser of the laser transmitting end 3 into linear scanning laser light, so the laser beam is incident onto the reflective surface of the rotatable prism 44 as the scanning component of the scanning module 4 in the form of linear scanning laser light. In FIG. 15, after the linear scanning laser light is reflected by the reflective surface, it still scans a human body representing the target object in the form of the linear scanning laser light.

As shown in FIG. 15, the laser beam is shaped into linear scanning laser light, i.e., a linear light spot, by the shaping module of the laser transmitting end 3 of the lidar 1, and then the rotatable prism 44 is used as a scanning component. The use of a one-dimensional scanning module 4 can realize three-dimensional scanning, which thus significantly reduces the requirements for scanning component, reduces the cost of the whole machine, and can efficiently reflect the linear scanning laser light and scan the target object with the linear scanning laser light.

FIG. 16 is a principle block diagram of the lidar 1 according to some embodiments of the present disclosure.

According to some embodiments of the present disclosure, the laser transmitting end 3 of the lidar 1 includes a laser and a laser shaping module, wherein the laser is configured for emitting a laser beam for detecting a target object. The laser may be selected from solid-state lasers or semiconductor laser types, such as fiber lasers. However, the technical solutions proposed by the present disclosure include but are not limited to the aforementioned laser types, but any device capable of generating and emitting laser light may be used, and it is not limited in the present disclosure.

In addition, the laser transmitting end 3 also has a transmitting lens group, which is configured as a laser shaping module. The laser shaping module transmits the laser beam emitted by the laser, and the functions of collimation, homogenization and shaping of the laser beam are achieved. According to different design functions and purposes, one or more of the three functions of collimation, homogenization, and shaping may be used to finally form, for example, point-shaped or linear light spots.

The laser receiving end 5 has a detector, and the detector is configured for receiving the laser beam guided by the scanning module 4 and reflected from the target object. For example, as shown in FIG. 16, the laser beam is emitted by the laser transmitting end 3 of the lidar 1, and after being reflected and/or refracted by the reflective surface of the rotatable prism 44, the laser beam is projected to the target object and scans it. After that, the laser beam reflected from the target object first is incident onto the reflective surface of the prism 44, and then is received and detected by the laser receiving end 5 of the lidar 1 and/or after being reflected and/or refracted.

Here, a laser signal can be detected using a photoelectric type detector or a photothermal type detector, including, for example, an avalanche photodiode, a single photon detector, or a photomultiplier tube. However, in the technical solutions according to the present disclosure, the detector includes but is not limited to the aforementioned types. Any detector capable of converting a laser signal into an electrical signal can be used in the technical solutions proposed by the present disclosure, and it is not limited in the present disclosure.

According to some embodiments of the present disclosure, the laser receiving end 5 further has a receiving lens group. For example, the receiving lens group is disposed upstream of the detector along the propagation direction of the laser beam, so that the receiving lens group can receive and transmit the laser beam reflected from the target object and/or the laser beam reflected from the scanning module 4, and converge the reflected laser beam onto the detector of the laser receiving end 5. When the linear scanning beam is irradiated onto a detection target object, the target object generates a diffuse reflection beam, and the diffuse reflection beam is received by the laser receiving end 5 after being reflected and/or refracted by the rotatable prism 44. The diffusely reflected light beam is collected by the receiving lens group of the laser receiving end 5 and then converged on the detector to form a detection signal.

Here, on the one hand, the prism 44 is configured for guiding the laser beam emitted by the laser transmitting end 3 and changing the propagation direction and manner of the laser beam to scan the target object; on the other hand, the prism 44 is configured for changing the propagation direction and manner of the light beam reflected from the target object and guiding it to the receiving lens group of the laser receiving end 5 of the lidar 1.

According to some embodiments of the present disclosure, the control module 6 is configured for controlling transmission and reception of laser light, and obtaining characteristic information of the target object through post-signal data processing. The control module 6 may be configured as an independent electronic device relative to the lidar 1, and is separated from the lidar body in structure and arrangement position. Alternatively, the control module 6 may also optionally be configured as an integral part of the lidar 1. Here, the control module 6 includes, for example, a laser driving module 62, a signal processing module 63 and a main control module 61. The laser driving module 62 is used to control the laser of the laser transmitting end 3 to emit laser light. The signal processing module 63 is used to process the detection signal received by the detector of the laser receiving end 5. The main control module 61 is used to control the laser driving module 62 and the signal processing module 63, and use the signal processing module 63 to calculate the characteristic information of the target object, such as the distance and position of the target object, etc. Optionally, the main control module 61 may also control and adjust the laser driving module 62 and/or the scanning module 4 according to the characteristic information fed back by the signal processing module 63, so that the working state or working mode of the laser driving module 62 and/or the scanning module 4 can be automatically adjusted in a closed-loop control manner, for example, to dynamically and automatically adjust the performance of the lidar, such as field of view, scanning resolution, etc.

Specifically, the control module 6 may control the laser, so as to control the timing and manner of the laser emitting the laser beam, etc. For example, the laser beam may be emitted from the laser in a continuous manner or in a pulsed manner. It should be pointed out that the characteristic information of the target object includes but is not limited to characteristic parameters such as speed, position, and shape, and further includes other parameters that can be derived or calculated therefrom. The control module 6 may also control the scanning component of the scanning module 4, so as to control parameters such as the rotational speed of the rotating scanning component, for example. Of course, the control module 6 may also control the detector of the laser receiving end 5.

Figure 19:
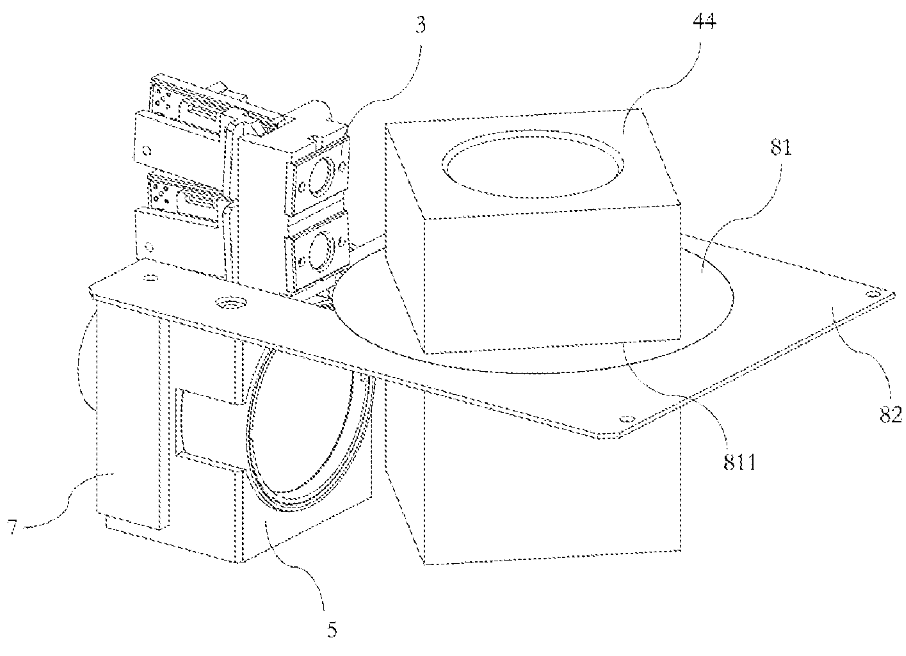
FIG. 19 is a schematic structural perspective view of a lidar according to some embodiments of the present disclosure.

FIG. 19 is a schematic structural perspective view of a lidar 1 according to some embodiments of the present disclosure. Here, reference numeral 7 is used to denote a housing 7 of the lidar 1, which defines an interior space of the lidar 1. The constituent components of the lidar 1, including but not limited to the laser transmitting end 3, the laser receiving end 5, the scanning module 4, the optional control module 6 and other optical and electronic element and components, are arranged in the interior space defined by the housing 7 of the lidar 1. The specific structure of the housing 7 can be designed and changed according to the installation and use environment of the lidar 1, and it is not limited in the present disclosure.

According to some embodiments of the present disclosure, at least one laser transmitting end 3 and at least one laser receiving end 5 are integrated into one laser transceiver module group 2. Each laser transceiver module group 2 is configured as a separate structural unit. For example, in each laser transceiver module group 2, the laser transmitting end 3 and the laser receiving end 5 integrated in the laser transceiver module group 2 are arranged in a common structural unit housing in close proximity and side by side. That is to say, a separate structural unit can be formed by integrating at least one laser transmitting end 3 and at least one laser receiving end 5 into a common laser transceiver module group housing. In FIG. 19, one laser transmitting end 3 and one laser receiving end 5 are integrated into one laser transceiver module group 2 configured as a separate structural unit. One laser transceiver module group 2 is provided in the housing 7 of the lidar 1. Optionally, two or more laser transceiver module groups 2 may also be provided, as described in the previous embodiments.

In addition, the number of lasers and the number of shaping modules are not limited in the laser transmitting end 3, and may be one or more. Likewise, the number of detectors and the number of receiving lens groups are not limited in the laser receiving end 5, and may be one or more. The number of corresponding constituent components can be increased or decreased according to requirements and reasonable arrangements, and the concept of the present disclosure is not limited to the number and manner of the constituent components described as examples.

In some embodiments of the present disclosure, each laser transceiver module group 2 may be integrated with different numbers of laser transmitting ends 3 and laser receiving ends 5. For example, in one laser transceiver module group 2, a plurality of laser transmitting ends 3 correspond to one laser receiving end 5; or one laser transmitting end 3 corresponds to a plurality of laser receiving ends 5; or one laser transmitting end 3 corresponds to one laser receiving end 5; or a plurality of laser transmitting ends 3 correspond to a plurality of laser receiving ends 5. By appropriately setting and matching the relationship between the number of laser transmitting ends 3 and the number of laser receiving ends 5, and reasonably setting the number of the laser transceiver module groups 2, it facilities the flexible adjustment (especially increase) of the field of view and scanning resolution of the lidar 1. In the embodiment shown in FIG. 19, the laser transceiver module group 2 includes exactly two laser emitting ends 3 and one laser receiving end 5.

It may also be considered that the separate laser transmitting end 3 and the separate laser receiving end 5 are connected side by side to each other to form a separate structural unit by means of mechanical connection. It may further be considered that the laser transmitting end 3 and the laser receiving end 5 are directly constructed in a common structural module, thereby forming a separate structural unit. In the embodiment shown in FIG. 19, two laser transmitting ends 3 and one laser receiving end 5 form one laser transceiver module group 2, which is in particular a separate structural unit.

It should be pointed out here that the laser transmitting end 3 and the laser receiving end 5 may be in an up-down positional relationship, or a left-right positional relationship, or other positional relationship relative to each other, all of which are within the scope of the concepts of the present disclosure. It is important here that the laser transmitting end 3 and the laser receiving end 5 integrated as the structural unit or the laser transceiver module group 2 can emit and receive the laser beam normally, respectively, without causing optical path interference between the laser transmitting end 3 and the laser receiving end 5 of one laser transceiver module group 2 or between the laser transmitting ends 3 and the laser receiving ends 5 of different laser transceiver module groups 2.

In some embodiments of the present disclosure, the lidar 1 includes a plurality of laser transceiver module groups 2, and the plurality of laser transceiver module groups 2 are distributed and arranged relative to the prism 44. According to the specific structural and functional requirements of the lidar 1, a specific number of laser transceiver module groups 2 may be selected. For example, the lidar 1 includes an even number of laser transceiver module groups 2, such as 2, 4, 6, 8, 10, 12 or even more laser transceiver module groups 2, and these laser transceiver module groups 2 may be generally symmetrically or asymmetrically distributed on both sides as separate structural units relative to the scanning module 4.

It may also be considered that the lidar 1 includes more than one odd number of laser transceiver module groups 2, such as 3, 5, 7, 9, 11 or even more laser transceiver module groups 2. These laser transceiver module groups 2 may be symmetrically or asymmetrically distributed on both sides as separate structural units relative to the scanning module 4. Factors that determine the arrangement of the laser transceiver module groups 2 include, but are not limited to: strengthening an important area or key area for scanning, dealing with a special scanning angle range and changing the scanning frequency/scanning angular resolution of a specific area in a targeted manner.

As shown in FIG. 19, a rotatable prism 44 is used as a scanning component of the scanning module 4 here. The prism 44 is fixed on a base 42 (referring to FIG. 18). Here, the prism 44 is fixed upright on the base 42, and a rotational motion can thus be transmitted to the prism 41 with the base 42. The base 42 can be driven by an electric motor 43 (referring to FIG. 18) to rotate about a rotation axis. Thus, the linear scanning laser light is reflected and/or refracted by the rotatable prism 44 to form a two-dimensional scan, especially in the horizontal scanning direction as shown in FIG. 15. In this regard, the control module 6 may also be configured for controlling the starting, stopping and working modes of the electric motor 43, etc., especially for regulating the rotational speed of the electric motor 43, thereby adjusting the rotational movement of the prism 44.

The lidar 1 further comprises an isolation mechanism, and the isolation mechanism separates a surface of the rotatable prism 44 into a transmission scanning area and a reception scanning area. Meanwhile, the isolation mechanism also isolates the laser transmitting end 3 and the laser receiving end 5 of the laser transceiver module group 2 configured as the separate structural unit from each other. The isolation mechanism is made of a material capable of eliminating, filtering or blocking stray light. The stray light is generated by, for example, the internal and external environment of the lidar, the structure of the lidar itself, optical components arranged in the lidar, or optical components related to the lidar, and the like. For example, the stray light may be generated by the scanning component of the scanning module of the lidar itself and/or by the shaping module of the laser transmitting end and/or by the laser of the laser transmitting end, etc. Thus, for example, the adverse effects of stray light that may be generated when the prism 44 reflects the laser beam on the operation of the lidar 1 can be at least partially or even completely eliminated by the isolation mechanism.

In FIG. 19, the isolation mechanism is composed of a circular rotating partition 81 and a fixed partition 82 having a circular hole. The fixed partition 82 is, for example, fixed on the housing 7 of the lidar 1, so that in addition to isolation, it can also support the internal structure of the entire lidar 1, or be used to carry optoelectronic components or other electronic devices. In addition, the fixed partition 82 fixed on the housing 7 of the lidar 1 also extends across the laser transceiver module group 2 arranged in the interior space of the housing 7 of the lidar 1 and configured as a separate structural unit, and isolates the laser transmitting end 3 and the laser receiving end 5 of the laser transceiver module group 2 from each other.

A circular hole is provided in the fixed partition 82, the rotating partition 81 is in a circular shape, and its circular diameter matches the diameter of the circular hole provided in the fixed partition 82. Therefore, the rotating partition 81 can be embedded into the circular hole of the fixed partition 82 when assembling the lidar, and can be rotated in the circular hole of the fixed partition 82 when the lidar is operating.

In order to enable the circular-shaped rotating partition 81 to rotate smoothly in the circular hole of the fixed partition 82, and at the same time to block the stray light generated by the internal and external environment of the lidar, the structure of the lidar itself, the optical components arranged in the lidar, or the optical components related to the lidar, and the like, which may adversely affect the operation of the lidar 1, a sliding and sealing coating may be provided between the outer circumference of the rotating partition 81 and the circular hole of the fixed partition 82. On the one hand, it can improve the sliding performance between the rotating partition 81 and the fixed partition 82, and on the other hand, it can maintain the seamless cooperation between the rotating partition 81 and the fixed partition 82, so as to completely block the stray light that would adversely affect the operation of the lidar 1. The coating here may be a structurally modified layer on the surface of the material, or may also be an attached layer of lubricating/sealing material.

The fixed partition 82 and the rotating partition 81 embedded in the circular hole of the fixed partition 82 form a partition plane, which divides an interior space of the housing 7 of the lidar 1 into two chambers, and wherein the transmission scanning area of the prism 44 and the laser transmitting end 3 of the laser transceiver module group 2 are disposed in one of the chambers, and the reception scanning area of the prism 44 and the laser receiving end 5 of the laser transceiver module group 2 are disposed in the other chamber.

In the embodiment shown in FIG. 19, the rotating partition 81 has an opening 811, and the prism 44 extends through the opening 811 of the rotating partition 81 and is fixed with the rotating partition 81. Here, the opening 811 of the rotating partition 81 matches the polygonal cross-sectional shape of the prism 44. In some embodiments, the size of the opening 811 of the rotating partition 81 and the cross-sectional size of the prism 44, on the one hand, can form a close fit so as to prevent stray light from passing through the opening 811 of the rotating partition 81 to propagate; and on the other hand, can form a force transmission fit, so that the prism 44 can drive the rotating partition 81 to rotate together when the lidar is operating. Here, the transmission scanning area and the reception scanning area of the prism 44 are respectively formed on one side of the rotating partition 81.

Instead of providing the opening 811 in the rotating partition 81, other structural forms may also be used to fix the prism 44 and the rotating partition 81. For example, the rotating partition 81 is composed of two semicircular plates, which are connected on both sides of the prism 44, for example by bonding, welding or integral forming, and are spliced together to form a complete circle.

In FIG. 19, the partition plane formed by the fixed partition 82 and the rotating partition 81 divides the interior space of the housing 7 of the lidar 1 into an upper chamber and a lower chamber, wherein the upper chamber is arranged with assemblies related to transmission of laser light, including but not limited to the laser transmitting ends 3 of the laser transceiver module groups 2 and the transmission scanning area of the prism 44, and the lower chamber are arranged with assemblies related to reception of laser light, including but not limited to the laser receiving ends 5 of the laser transceiver module groups 2 and the reception scanning area of the prism 44.

According to the present disclosure, through the isolation mechanism composed of the circular rotating partition 81 and the fixed partition 82 with the circular hole, the emitted linear scanning beam and the reflected beam of the target object are reflected in different areas of the rotatable prism 44, so as to effectively isolate the transmission and reception light paths and avoid the risk of stray light.

It should be pointed out that the positional relationship between the laser transmitting end 3 and the laser receiving end 5 of each laser transceiver module group 2 in the separate structural unit can be set as needed. For example, they may be placed up and down or left and right. Meanwhile, the laser transmitting end 3 and the laser receiving end 5 may be located in different chambers in the interior space of the housing 7 of the lidar 1 without being affected by the mutual positional relationship between the laser transmitting end 3 and the laser receiving end 5. That is to say, the partition plane formed by the fixed partition 82 and the rotating partition 81 may also divide the interior space of the housing 7 of the lidar 1 into two chambers, left and right, or two chambers in any other possible positional relationship.

Likewise, the interior space of the housing 7 of the lidar 1 can be divided into more functional chambers by using an isolation mechanism. For example, the structural unit casing of the laser transceiver module group 2 and the casing 7 of the lidar 1 can be integrally formed, so as to form a separate chamber for laser transceiver module group. In this case, the relative positional relationship between the laser transceiver module group 2 and the scanning component of the scanning module 4 can be accurately determined in advance, which simplifies the optical calibration steps that must be performed in the process of assembling the lidar 1, and makes the lidar 1 itself easy to implement modular structure.

It should be pointed out that no matter what structural form the rotating partition 81 itself adopts, or how the interior space of the housing 7 of the lidar 1 is divided, the partition plane formed by the fixed partition 82 and the rotating partition 81 and the surface of the prism 44 forms an angle, and are in particular perpendicular to each other. In the case of being perpendicular, it is easy for the lidar 1 to realize that the rotation axis of the prism 44 coincides with the rotation axis of the output shaft of the driving motor 43 in structure, which not only facilitates simplified structural design of the lidar 1, but also facilitates efficient scanning in the horizontal direction using linear scanning laser light.

Of course, it may also be considered that the partition plane formed by the fixed partition 82 and the rotating partition 81 forms other angles, such as 30° or 60°, with the surface of the prism 44. This means that the laser beams emitted by the laser transmitting ends 3 of each laser transceiver module groups 2 may form different angles with the surface of the prism 44, so that the special field-of-view angle, scanning range, or other scanning characteristics of the lidar 1 can be achieved according to requirements.

The isolation mechanism may also include a bottom plate 83, and the bottom plate 83 additionally divides the interior space of the housing 7 of the lidar 1 to obtain a separate equipment chamber. In FIG. 19, the bottom plate 83 separates the housing 7 of the lidar 1 to obtain a separate equipment chamber below the partition plane formed by the fixed partition 82 and the rotating partition 81, and an electric motor 43 for driving the base 42 to rotate may be disposed in this separate equipment chamber. Of course, other electromechanical assemblies, such as the control module 6 itself or electronic devices associated therewith, etc., may also be accommodated in this equipment chamber.

In some embodiments of the present disclosure, the interior space of the housing 7 of the lidar 1 is formed with a three-chamber structure as a whole by an isolation mechanism including a fixed partition 82, a rotating partition 81 and a bottom plate 83. Thus, through simple and effective measures, functional optimization and structural partitioning at the optical, electrical and mechanical levels are achieved, which not only avoids unfavorable stray light optically, but also shields harmful electromagnetic interference, and can mechanically achieve modular manufacturing and assembly.

The laser shaping module can shape the laser beam emitted by the laser of the laser transmitting end 3 into linear scanning laser light, and the prism 44 reflects and/or refracts the linear scanning laser light and/or and scans the target object. Specifically, the laser transmitting end 3 emits a ray of light, which can be regarded as a number of continuous points in the vertical direction, and the target area/object is scanned by rotating the prism 44. Meanwhile, by shaping the laser beam into linear scanning laser light, in combination with other improvement measures for the lidar 1 proposed in the present disclosure, an improved field of view of the lidar 1 can be obtained, which significantly improves the working flexibility, reliability and work performance of the lidar 1.

Figure 20:
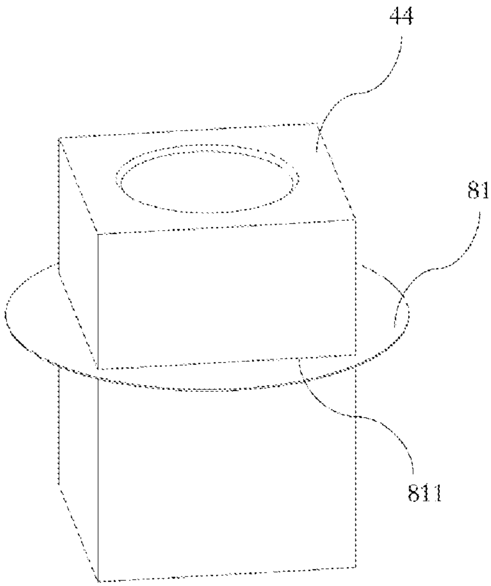
FIG. 20 is a schematic structural perspective view of a scanning module of a lidar according to some embodiments of the present disclosure.

FIG. 20 is a schematic structural perspective view of a scanning module 4 of a lidar 1 according to some embodiments of the present disclosure. Similar to the structure of FIG. 18, the prism 44 may be mounted in an upright manner on, for example, a circular base 42 (referring to FIG. 18). The base 42 can be driven by an electric motor 43 below to rotate about a vertical rotation axis, and thus drives the rotatable prism 44 to rotate together. Here, on the one hand, the surface of the prism 44 is perpendicular to the rotation plane of the base 42, and on the other hand, the rotation axes of the two coincide with each other.

The base 42 can be directly arranged on the housing 7 of the lidar 1 by using structures such as bearings, or similar to the structure as shown in FIG. 17, the base 42 may also be arranged on the bottom plate 83, and the bottom plate 83 (referring to FIG. 17) divides the interior space of the housing 7 of the lidar 1 to obtain a separate equipment chamber. In the case that there is a separate equipment chamber, the electric motor 43 for driving the base 42 to rotate, or other driving/transmission mechanisms, may be conveniently arranged in the equipment chamber. An output shaft of the electric motor 43 may be connected to the base 42 carrying the prism 44 through the bottom plate 83. This design scheme not only achieves the partitioning of optical and mechanical functions, but also facilitates shielding the electromagnetic radiation generated by the electric motor 43 during operation, further improving the working stability and reliability of the lidar 1.

In the embodiment shown in FIG. 20, a rectangular quadrangular prism 44 passes through a rectangular opening 811 of a circular rotating partition 81 and is fixed to the rotating partition 81 without any gap. Here, the opening 811 of the rotating partition 81 may be press-fitted with the prism 44 to prevent stray light from propagating through the gap between the rotating partition 81 and the prism 44. Alternatively, other sealing and fixing measures may also be considered. For example, other gap fillers and/or adhesives are filled between the opening 811 of the rotating partition 81 and the prism 44. Thus, on the one hand, it avoids a gap between the opening 811 of the rotating partition 81 and the prism 44 that may allow stray light to propagate; and on the other hand, it ensures a firm force transmission connection formed between the rotating partition 81 and the prism 44, so that the prism 44 can also drive the rotating partition 81 to rotate together. Optionally, other forms of polygonal prisms may be used here, such as triangular prisms, quadrangular prisms, etc., especially equilateral triangular prisms or right-angle prisms.

In some embodiments, the rotating partition 81 and the bottom plate 83 may be parallel to each other, and both may be perpendicular to the reflective surface of the prism 44. Here, the rotation axis of the output shaft of the electric motor 43 for driving the base 42 to rotate passes through the center of the circular base 42 and the rotating partition 81, and coincides with the rotation axis of the prism 44.

The scanning module 4 according to the present disclosure, including but not limited to the prism 44, the rotating partition 81, the base 42 and the electric motor 43, may be constructed as a separate pre-assembled module, thereby greatly simplifying the manufacturing and assembly processes of the lidar 1, and it can be easily replaced and repaired when needed.

In some embodiments of a manufacturing method for the lidar 1 according to the present disclosure, the scanning component of the scanning module 4 is constructed as a rotatable prism 44. In addition, an isolation mechanism is disposed to separate the surface of the prism 44 into a transmission scanning area and a reception scanning area while isolating the laser transmitting end 3 and the laser receiving end 5 of a laser transceiver module group 2 configured as a separate structural unit. The isolation mechanism is composed of a circular rotating partition 81 and a fixed partition 82 with a round hole, wherein the fixed partition 82 is fixed on the housing 7 of the lidar 1, the rotating partition 81 is embedded into the circular hole of the fixed partition 82 during assembly, and the rotating partition 81 can be rotated in the circular hole of the fixed partition 82. The prism 44 can drive the rotating partition 81 to rotate together.

Finally, it should be understood by those skilled in the art that the embodiments of the present disclosure shown in the above description and the accompanying drawings are only used as examples and not intended to limit the technical solutions or concepts of the present disclosure. All the technical features described here for the lidar 1, as long as they do not violate the laws of nature or technical specifications, can be arbitrarily combined or replaced within the framework of the concepts of the present disclosure, all of which falls within the scope of the concepts of the present disclosure, and does not constitute a limitation to the present disclosure.

What is claimed is:

1. A lidar, comprising:

a laser transmitting end, wherein the laser transmitting end has a laser, and the laser is configured for emitting a laser beam for detecting a target object;

a scanning module, wherein the scanning module is configured for guiding the laser beam emitted by the laser to scan the target object, and receiving and guiding the laser beam reflected from the target object; and a laser receiving end, wherein the laser receiving end has a detector, and the detector is configured for receiving the laser beam guided by the scanning module and reflected from the target object;

wherein at least one laser transmitting end and at least one laser receiving end are integrated into a laser transceiver module group configured as a separate structural unit, and wherein the lidar comprises a plurality of laser transceiver module groups, the plurality of laser transceiver module groups are arranged in a distributed manner relative to the scanning module, and an at least partially stitched field of view of the lidar is formed by sub-fields of view correspondingly formed by the plurality of laser transceiver module groups;

wherein the lidar is configured to operate in a normal working mode and at least one of an enhanced working mode and an emergency working mode;

a control module configured for controlling transmission and reception of laser beams, and obtaining characteristic information of the target object through post-signal data processing;

an orientation adjustment device assigned to each laser transceiver module group, wherein each orientation adjustment device comprises an actuator, and the control module is further configured to control the actuator for driving the orientation adjustment device, so as to achieve orientation adjustment of a corresponding laser transceiver module group; and a fault detection device, wherein the control module is configured to monitor functionality of working laser transceiver module groups using the fault detection device to determine whether one of the laser transceiver module groups fails or is externally damaged, and upon such determination, to switch to the emergency working mode to put a spare laser transceiver module group into use;

wherein in the normal working mode, the sub-fields of view of the plurality of laser transceiver module groups at least partially overlap each other to form the stitched field of view of the lidar;

wherein, when operating in the enhanced working mode, the lidar is configured to adjust orientations of the laser transceiver module groups to obtain an increased stitched field of view, vertical-axis angular resolution and/or horizontal angular resolution in a specific area or key area; and wherein, when operating in the emergency working mode, the lidar is configured to activate the spare laser transceiver module group to replace the failed or externally damaged laser transceiver module group.

2. The lidar according to claim 1, wherein the laser transmitting end further comprises a transmitting lens group, which has a laser shaping module configured for shaping the laser beam emitted by the laser, wherein the laser shaping module comprises a collimator and a homogenizer sequentially arranged along an optical axis of the laser beam.

3. The lidar according to claim 1, wherein the scanning module comprises a transmission scanning module and a reception scanning module, and wherein the transmission scanning module is configured for reflecting the laser beam emitted by the laser transmitting end to the target object, and the reception scanning module is configured for receiving and guiding the laser beam reflected from the target object to the laser receiving end, wherein the laser receiving end further has a receiving lens group, and the receiving lens group is configured for receiving and transmitting the laser beam guided by the scanning module and reflected from the target object, and converging the reflected laser beam onto the detector of the laser receiving end.

4. The lidar according to claim 1, wherein included angles between the laser beams emitted by the laser transmitting ends of the plurality of laser transceiver module groups and a reflective surface of the scanning module are different from each other, so that the plurality of laser transceiver module groups separately form sub-fields of view with different orientations and at least partially overlapping each other.

5. The lidar according to claim 4, wherein the control module (6) is configured to control the orientation adjustment devices to individually set different included angles for the plurality of laser transceiver module groups (2) relative to the reflective surface according to the characteristic information, so as to adjust a horizontal angular resolution or a vertical-axis angular resolution in a specific area of the stitched field of view.

6. The lidar according to claim 1, wherein the actuator of each orientation adjustment device comprises at least one of: an electric motor, a hydraulic actuator, a pneumatic actuator, and a piezoelectric actuator, and wherein the actuator is configured to drive the orientation adjustment device in response to a control signal from the control module (6) to change an orientation of a corresponding laser transceiver module group (2).

7. The lidar according to claim 1, wherein through the orientation adjustment device, the plurality of laser transceiver module groups are configured to adjust their orientations relative to a reflective surface of the scanning module, thereby changing the stitched field of view and/or scanning resolution of the lidar.

8. The lidar according to claim 1, wherein a scanning component of the scanning module is a rotating scanning component, wherein the scanning component of the scanning module comprises a double-faceted mirror, a multifaceted prism or an oscillating mirror, wherein the scanning component of the scanning module comprises a different-faceted prism, and wherein included angles between reflective side surfaces of the different-faceted prism and a central axis are different from each other and match each other, so that sub-fields of view correspondingly formed by each of the reflective side surfaces at least partially overlap each other, thereby forming a stitched field of view of the lidar.

9. The lidar according to claim 1, wherein a scanning component of the scanning module is configured as a rotatable plate-shaped double-faceted mirror or a rotatable prism.

10. The lidar according to claim 9, wherein at least one laser transmitting end and at least one laser receiving end are integrated into a laser transceiver module group configured as a separate structural unit, wherein the lidar further comprises an isolation mechanism, and the isolation mechanism separates a reflective surface of the plate-shaped double-faceted mirror into a transmission scanning area and a reception scanning area, wherein the isolation mechanism isolates the laser transmitting end and the laser receiving end of the laser transceiver module group configured as the separate structural unit.

11. The lidar according to claim 10, wherein the isolation mechanism is composed of a circular rotating partition and a fixed partition having a circular hole, and wherein the fixed partition is fixed on a housing of the lidar, and the rotating partition can be embedded in the circular hole of the fixed partition and rotated therein.

12. The lidar according to claim 11, wherein the rotating partition has an opening, and the plate-shaped double-faceted mirror extends through the opening of the rotating partition and is fixed with the rotating partition.

13. The lidar according to claim 11, wherein the fixed partition fixed on the housing of the lidar extends across the laser transceiver module group arranged in an interior space of the housing of the lidar, and isolates the laser transmitting end and the laser receiving end of the laser transceiver module group configured as the separate structural unit, wherein the plate-shaped double-faceted mirror can drive the rotating partition to rotate together, and wherein the transmission scanning area and the reception scanning area of the plate-shaped double-faceted mirror are respectively formed on one side of the rotating partition, wherein the fixed partition and the rotating partition embedded in the circular hole of the fixed partition form a partition plane, which divides an interior space of the housing of the lidar into two chambers, and wherein the transmission scanning area of the plate-shaped double-faceted mirror and the laser transmitting end of the laser transceiver module group are disposed in one of the chambers, and the reception scanning area of the plate-shaped double-faceted mirror and the laser receiving end of the laser transceiver module group are disposed in the other chamber.

14. The lidar according to claim 9, wherein the laser transmitting end further has a laser shaping module, which shapes the laser beam emitted by the laser into linear scanning laser light, and the plate-shaped double-faceted mirror reflects the linear scanning laser light and scans the target object.

15. The lidar according to claim 9, wherein the lidar further comprises an isolation mechanism, and the isolation mechanism separates a reflective surface of the rotatable prism into a transmission scanning area and a reception scanning area, wherein the isolation mechanism isolates the laser transmitting end and the laser receiving end of the laser transceiver module group configured as the separate structural unit.

16. The lidar according to claim 15, wherein the isolation mechanism is composed of a circular rotating partition and a fixed partition having a circular hole, and wherein the fixed partition is fixed on a housing of the lidar, and the rotating partition can be embedded in the circular hole of the fixed partition and rotated therein.

17. The lidar according to claim 16, wherein the rotating partition has an opening, and the rotatable prism extends through the opening of the rotating partition and is fixed with the rotating partition.

18. The lidar according to claim 17, wherein the fixed partition fixed on the housing of the lidar extends across the laser transceiver module group arranged in an interior space of the housing of the lidar, and isolates the laser transmitting end and the laser receiving end of the laser transceiver module group configured as the separate structural unit, wherein the rotatable prism can drive the rotating partition to rotate together, and wherein the transmission scanning area and the reception scanning area of the rotatable prism are respectively formed on one side of the rotating partition.

19. The lidar according to claim 16, wherein the fixed partition and the rotating partition embedded in the circular hole of the fixed partition form a partition plane, which divides an interior space of the housing of the lidar into two chambers, and wherein the transmission scanning area of the rotatable prism and the laser transmitting end of the laser transceiver module group are disposed in one of the chambers, and the reception scanning area of the rotatable prism and the laser receiving end of the laser transceiver module group are disposed in the other chamber.

20. The lidar according to claim 9, wherein the laser transmitting end further has a laser shaping module, which shapes the laser beam emitted by the laser into linear scanning laser light, and the rotatable prism reflects the linear scanning laser light and scans the target object.

* * * * *